(12) United States Patent
Wakahara et al.

(10) Patent No.: US 7,680,363 B2
(45) Date of Patent: Mar. 16, 2010

(54) OPTICAL PRESSURE SENSOR

(75) Inventors: Masahito Wakahara, Kyoto (JP);
Takahiro Imasaki, Kyoto (JP)

(73) Assignee: Suncall Corporation (JP)

( * ) Notice: Subject to any disclaimer, the term of this patent is extended or adjusted under 35 U.S.C. 154(b) by 47 days.

(21) Appl. No.: 11/836,217

(22) Filed: Aug. 9, 2007

(65) Prior Publication Data

US 2008/0085074 A1      Apr. 10, 2008

(30) Foreign Application Priority Data

Aug. 15, 2006   (JP)   ............................. 2006-221446
Aug. 3, 2007    (JP)   ............................. 2007-202701

(51) Int. Cl.
*G02B 6/00* (2006.01)

(52) U.S. Cl. ............................... 385/13; 385/12; 385/37

(58) Field of Classification Search ............. 385/12–14, 385/37
See application file for complete search history.

(56) References Cited

FOREIGN PATENT DOCUMENTS

JP    2002-071323    *   8/2002

* cited by examiner

*Primary Examiner*—Frank G Font
*Assistant Examiner*—Michael P Mooney
(74) *Attorney, Agent, or Firm*—Sterne, Kessler, Goldstein & Fox P.L.L.C.

(57) ABSTRACT

The present invention aims to provide an optical pressure sensor capable of detecting a more minute pressure change. A base film is formed with a through hole passing first and second surfaces, an optical fiber is fixed to the base film at a region other than the FBG portion such that the FBG portion is positioned on the through hole in plan view. The optical pressure sensor according to the present invention is attached to an object body such that the second surface of the base film is closely attached to a surface of the object body directly or indirectly.

25 Claims, 26 Drawing Sheets

F I G. 1
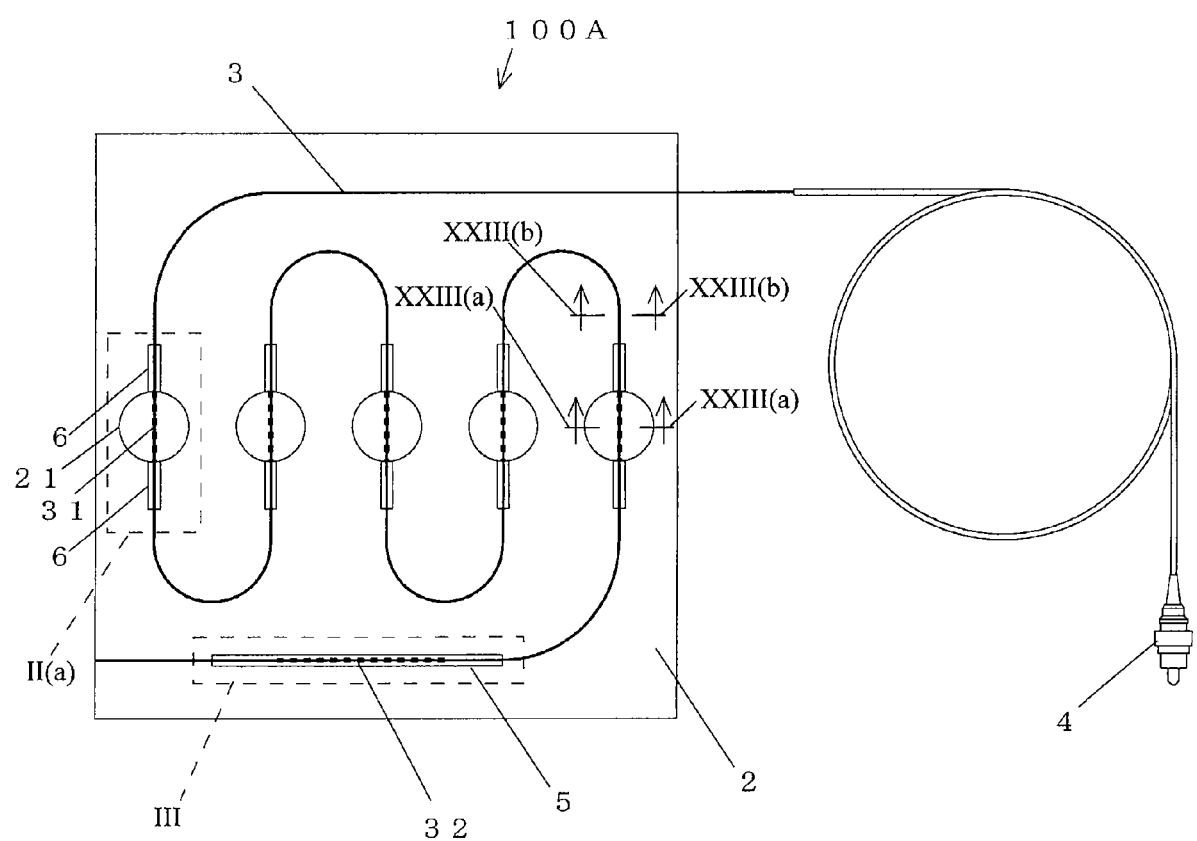

FIG. 2
(a)
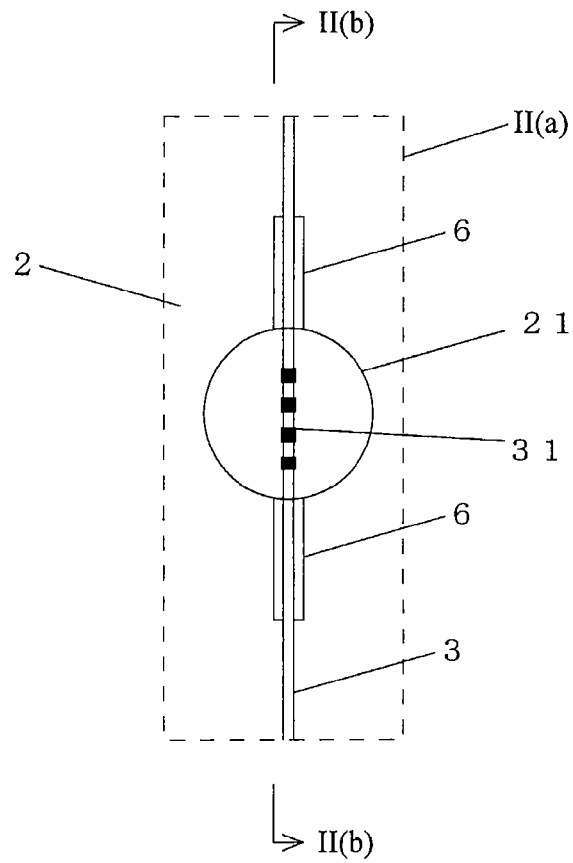
(b)
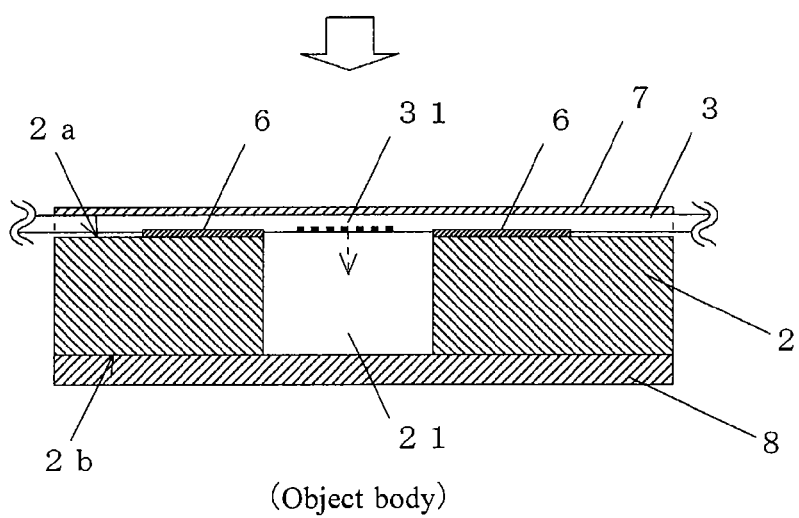
(Object body)

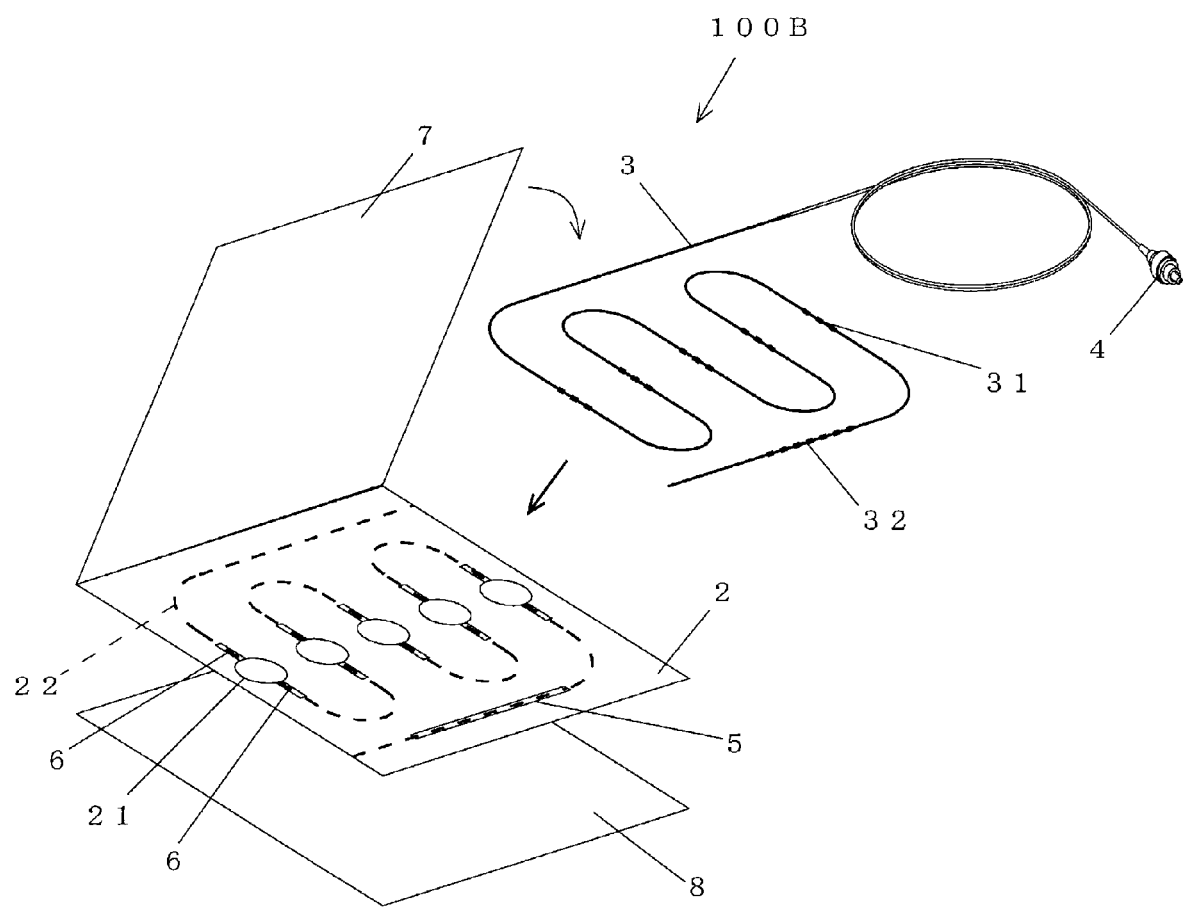
F I G. 5

FIG. 10
(a)
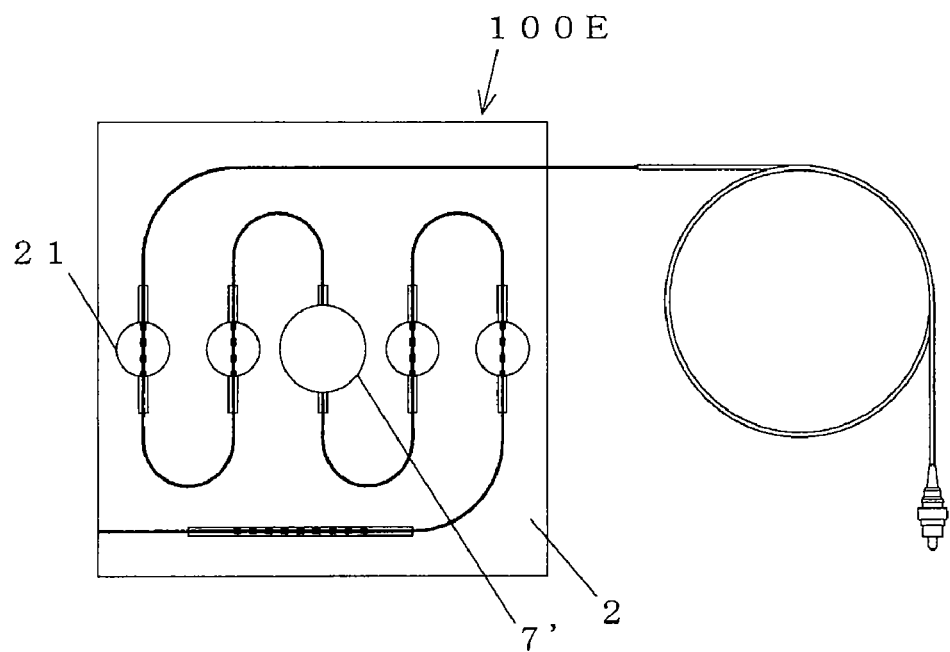
(b)
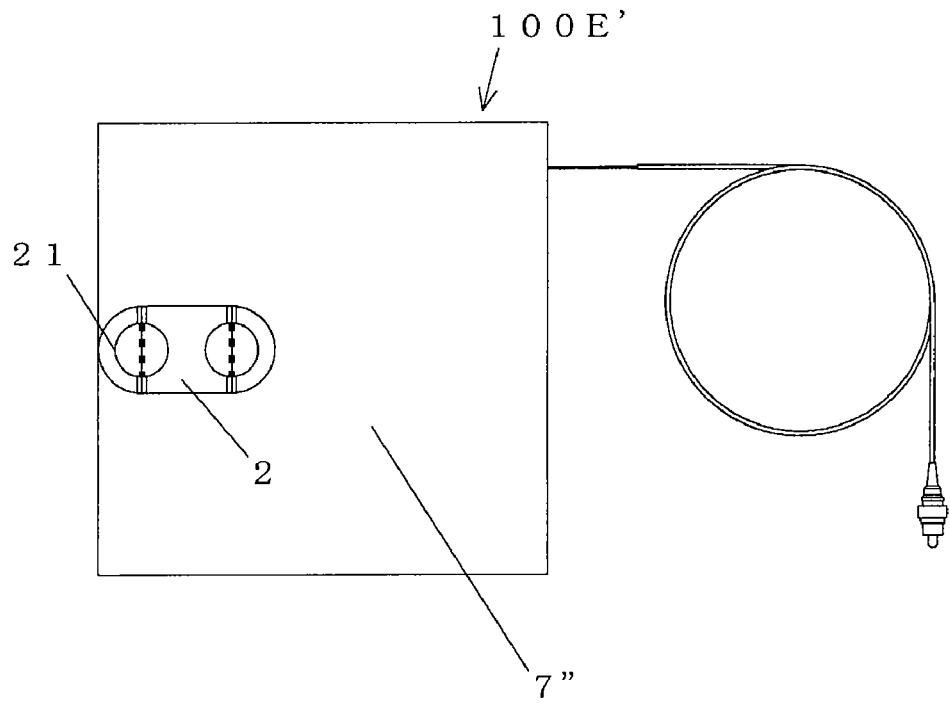

F I G. 1 2
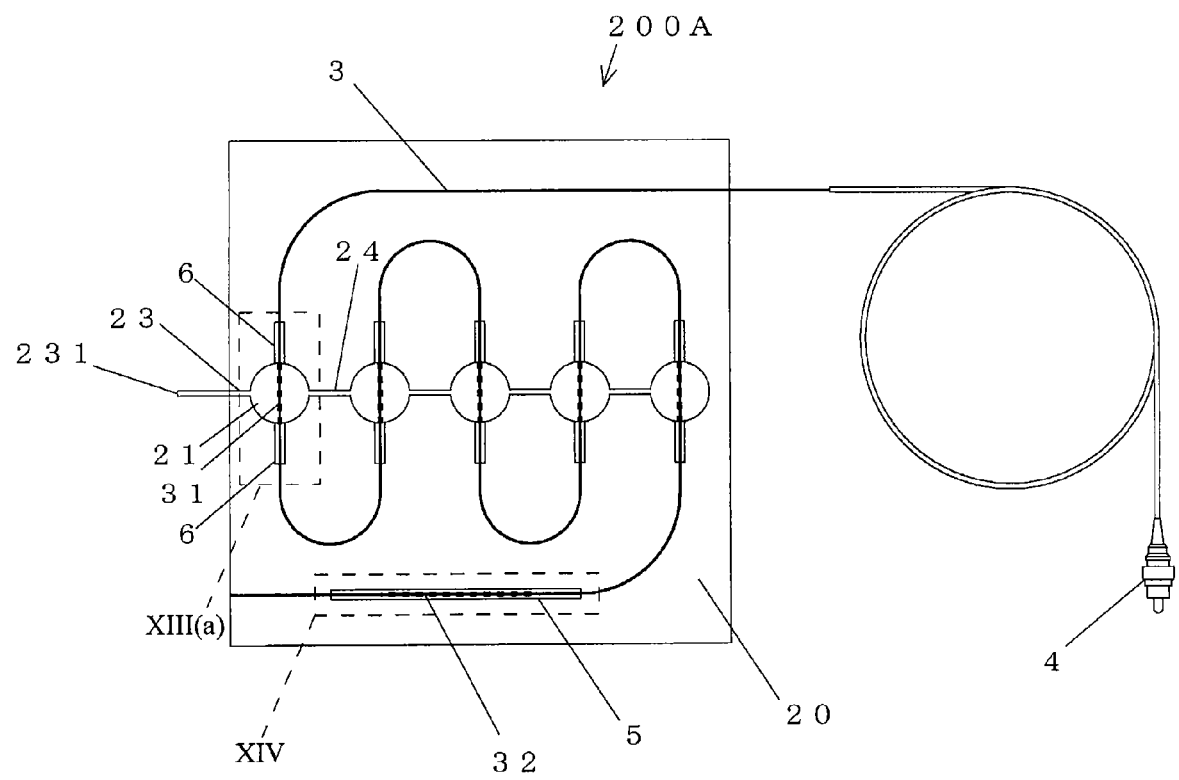

FIG. 13
(a)
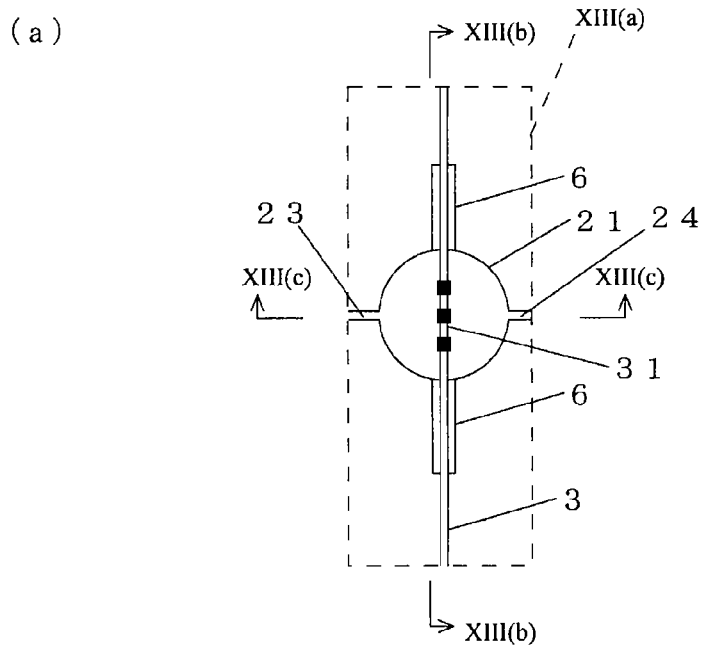
(b)
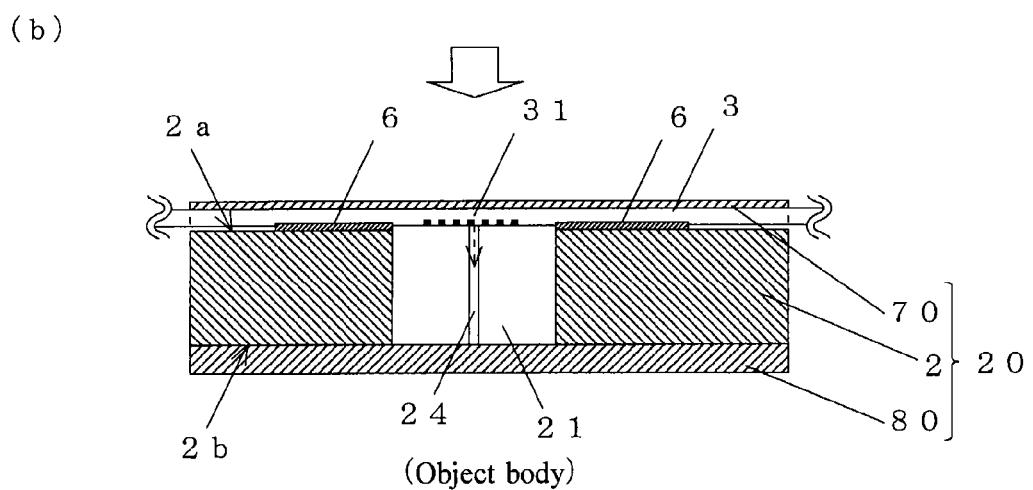
(Object body)
(c)
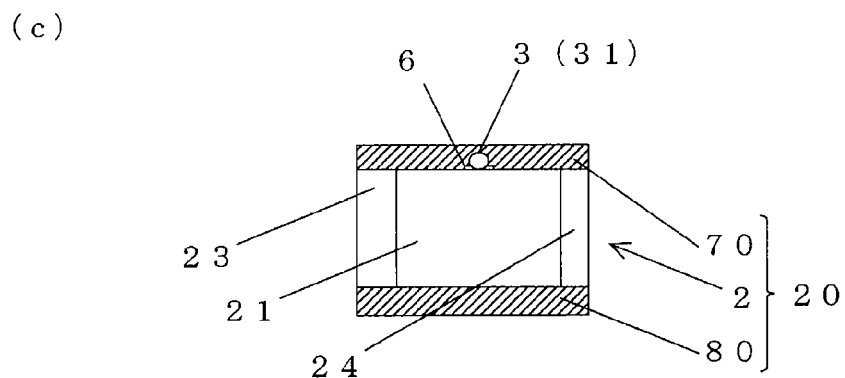

F I G. 1 8
(a)
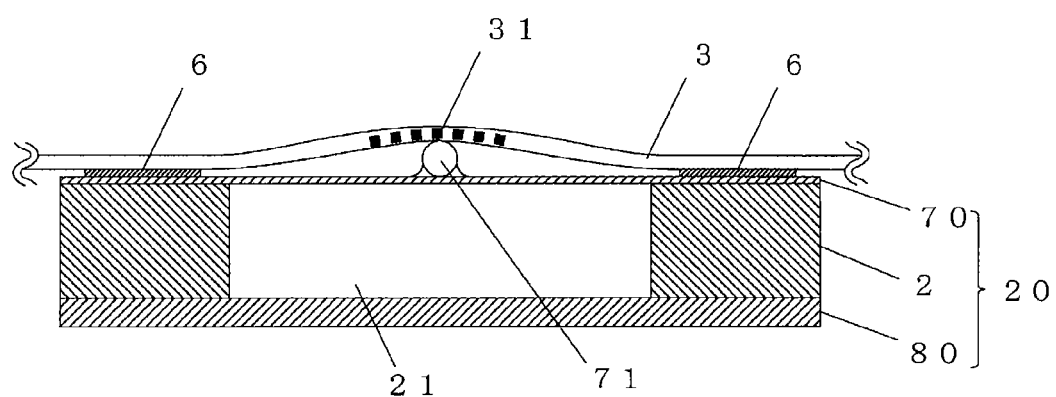
(b)
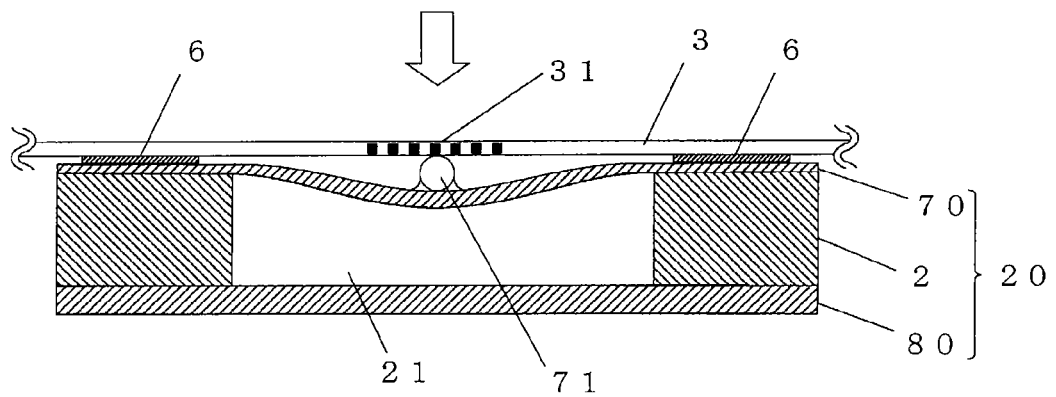
(c)
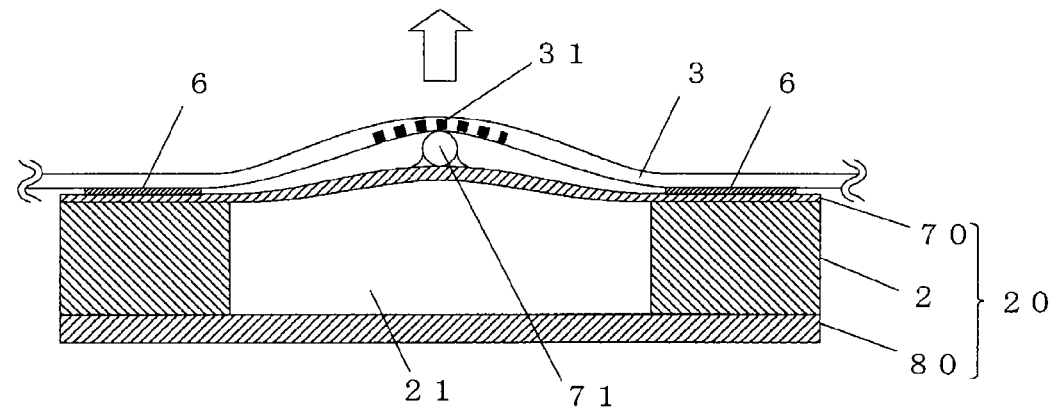

F I G. 1 9
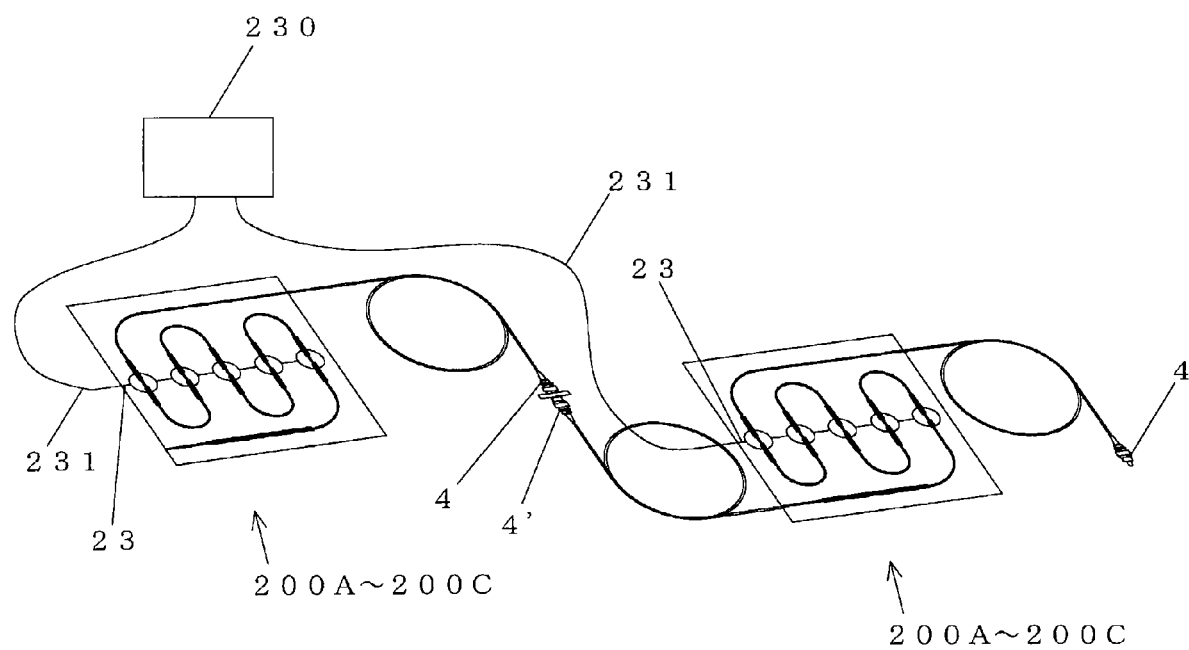

FIG. 23
(a)
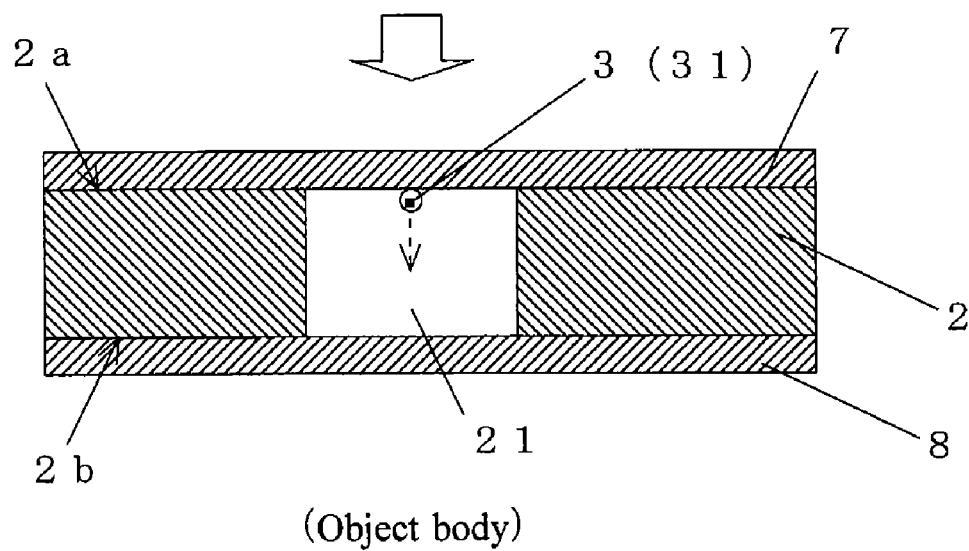
(Object body)
(b)
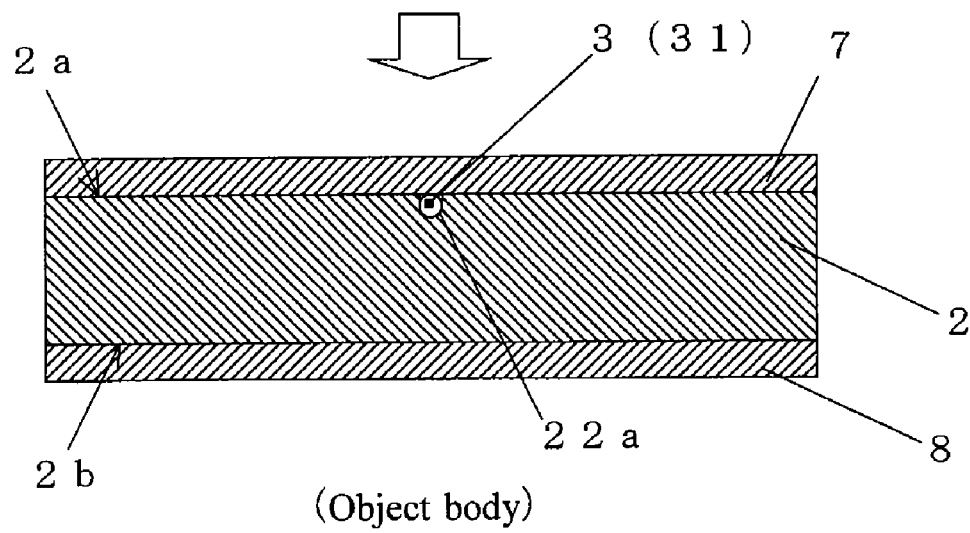
(Object body)

FIG. 24
(a)
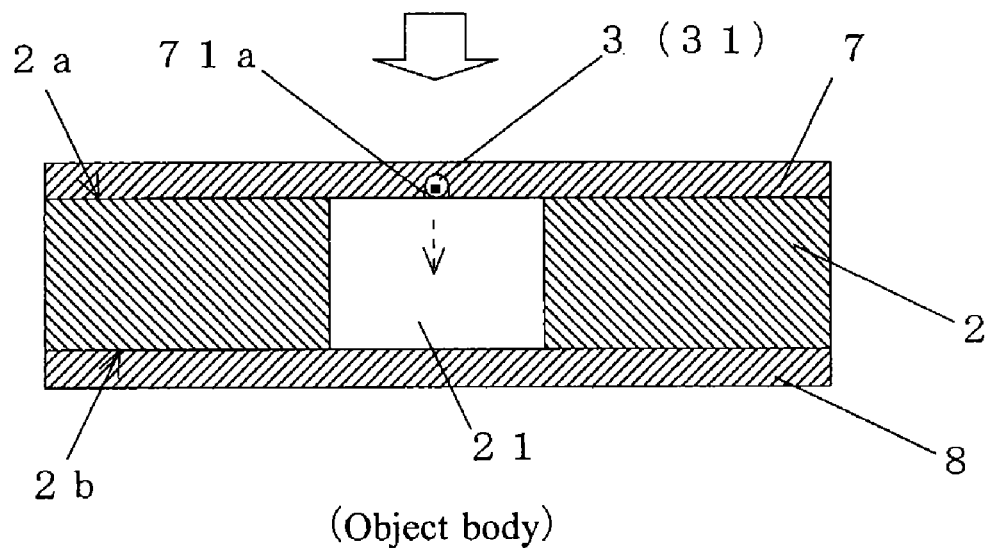
(Object body)
(b)
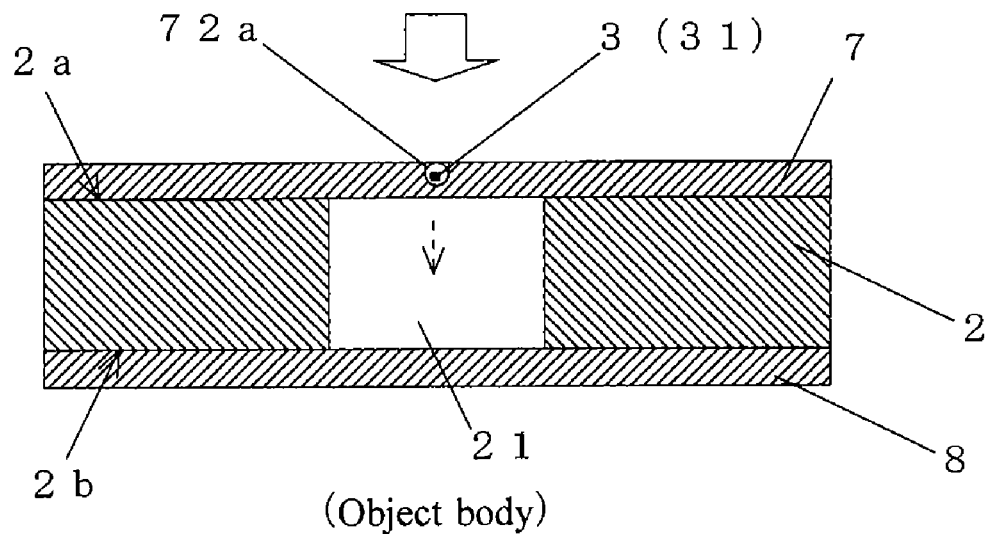
(Object body)

FIG. 26
(a)
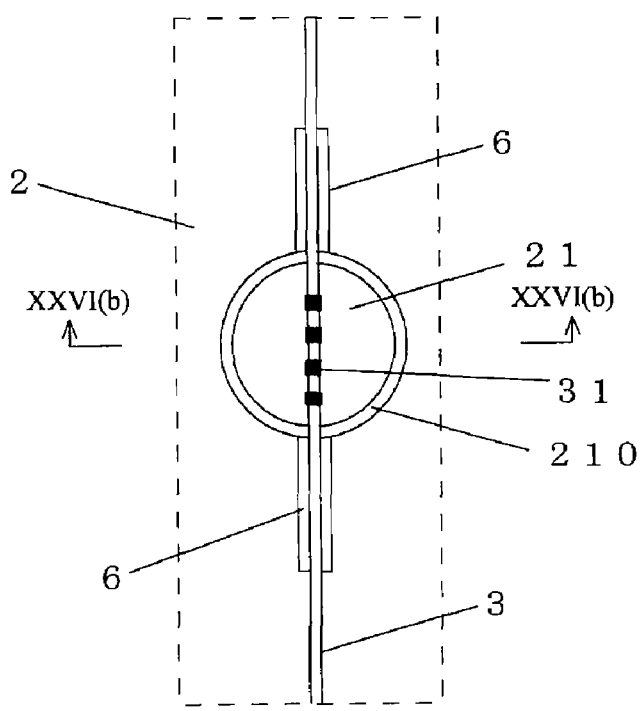
(b)
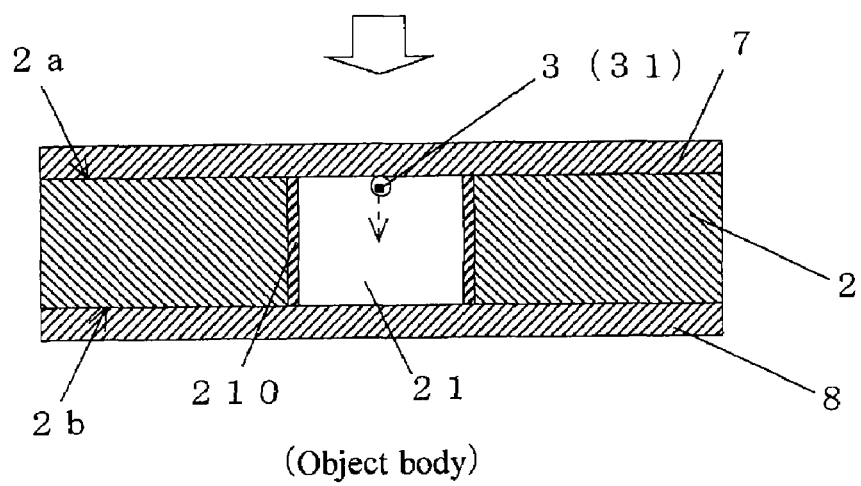
(Object body)

OPTICAL PRESSURE SENSOR

BACKGROUND OF THE INVENTION

1. Field of the Invention

The present invention relates to an optical pressure sensor equipped with an optical fiber including at least one FBG (Fiber Bragg Grating) portion.

2. Related Art

In the fields of design and analysis of automobiles, ships, airplanes and the like, various optimum designing has been carried out in terms of safety and higher efficiency. In particular, it is important to grasp the fluid physical quantity of air pressure or water pressure that acts on the object surface in the above fields. That is, optimum designing is carried out by feeding back the result obtained from the measurement of air pressure (wind pressure) by using a wind tunnel device that employs a reduced model and/or the measurement of water pressure by using a water tank.

A piezoelectric or semiconductor pressure sensor, and a strain gauge pressure sensor are known for measuring air pressure or water pressure.

However, such configuration has the following problems. In the piezoelectric and semiconductor pressure sensors, it is needed to bore a hole in the reduced model, insert a tube through the hole and electrically connect an opening end of the hole and a pressure sensor main body. The configuration has a technical limitation that the number of measurement points that could be arranged in the reduced model is up to tens to several tens. This is because the arrangement of a large number of measurement points is difficult since the tube has a diameter of several mm. With the strain gauge pressure sensor, an amplifier must be provided at each measurement point, and thus is practically difficult to carry out measurement at a large number of points. Furthermore, it is needed to bore a hole in an object body such as the reduced model in both the piezoelectric or semiconductor type and the strain gauge type. Therefore, the reduced model may be damaged due to water immersion from the hole when the reduced model is used for water pressure measurement. Furthermore, the strain gauge pressure sensor is electric, and therefore it may short-circuit due to water immersion.

An optical pressure sensor having an optical fiber with an FBG portion as a pressure sensitive portion is known as a pressure sensor that measures the pressure of the surface of the object body without boring any holes in the object body such as the reduced model (e.g., see Japanese unexamined publication No. 2002-71323, hereinafter referred to as prior document 1). The FBG portion is a portion where a grating (a diffraction grating) for reflecting only a predetermined wavelength of the incident light with respect to an advancing direction of the incident light is formed. The FBG portion is attached to a base film to form the sensor. When the pressure applying on the base film changes (i.e. when the base film strains due to the pressure change), the pressure change is also occurred on the FBG portion of the optical fiber attached to the base film. The pressure change on the FBG portion causes the diffraction pitch of the grating to change so that a peak of the wavelength of the light to be reflected is shifted. That is, the optical pressure sensor is configured so as to detect the amount of the pressure applying on the FBG portion (the strain amount of the FBG portion) by detecting the shift amount of the peak of the wavelength to be reflected at the time when the pressure applying on the FBG portion changes.

However, it is needed to detect a more minute pressure change in the optical pressure sensor as disclosed in the prior document 1 in order to carry out a safer and more efficient optimum designing. Further, there has been no optical pressure sensor capable of detecting both a positive pressure and a negative pressure (i.e., a differential pressure from a reference pressure).

SUMMARY OF THE INVENTION

In consideration of the above prior art, it is a first object of the present invention to provide an optical pressure sensor capable of detecting a more minute pressure change.

A second object of the present invention is to provide an optical pressure sensor capable of measuring the minute pressure change as a differential pressure with respect to a reference pressure.

One aspect of the present invention provides, in order to achieve the first object, an optical pressure sensor having a base film that includes first and second surfaces, the second surface being closely attached to a surface of an object body directly or indirectly; and an optical fiber that has at least one FBG portion and that is fixed to the base film, wherein the base film is formed with a through hole passing through the first and second surfaces, and the optical fiber is fixed to the base film at a region other than the FBG portion such that the FBG portion is positioned on the through hole in plan view.

The thus configured optical pressure sensor detects the pressure change on a side of the first surface of the base film in a state where the second surface of the base film is closely contacted to the surface of the object body directly or indirectly.

According to the configuration, it is possible to directly detect the pressure change at the FBG portion functioning as a sensitive portion when the pressure applying on the first surface is changed.

In one configuration, the FBG portion is wholly positioned on the through hole of the base film. According to the configuration, it is possible to effectively prevent the base film from hindering or attenuating the strain action of the FBG portion caused by the pressure change. Therefore, it is possible to detect a more minute pressure change in comparison with the conventional optical pressure sensor in which the pressure change is detected based on the bending of the base film.

Alternatively, the FBG portion may be partially positioned on the through hole. According to the configuration, it is possible to lower the sensitivity of the FBG portion in comparison with the one embodiment, thereby detecting the pressure at a portion of the object body subjected to a more high pressure.

The optical fiber preferably includes a plurality of the FBG portions that has different reflection characteristics one another and that are arranged along a longitudinal direction of the optical fiber.

It is possible to detect each of the shifts of the different Bragg wavelengths by having the reflection characteristics (the Bragg wavelengths) of the plurality of the FBG portions different one another. Therefore, it is possible to easily detect the pressures at a plurality of points without using tubes needed in the conventional piezoelectric or semiconductor pressure sensor, thereby detecting a more specific pressure change at each of the plurality of points over a wide area.

In one embodiment, the base film is formed with a plurality of the through holes. In the one embodiment, the optical fiber is arranged such that each of the plurality of FBG portions is arranged on the corresponding through hole of the plurality of through holes in plan view.

In the one embodiment, a flexible cover film is preferably arranged on the first surface of the base film so as to cover any of the plurality of through holes.

According to the configuration, it is possible to have the sensitivity of one FBG portion positioned in the through hole that is covered by the flexible cover film different from the sensitivity of the other FBG portion positioned in the through hole 21 that is not covered by the cover film. That is, the arrangement of the flexible cover film makes it possible to differ the sensitivity of the FBG portion with respect to each of the measuring points.

Therefore, it is possible to simultaneously detect the pressures at a plurality of measuring points subjected to extremely different pressures.

For instance, it is possible to cover one FBG portion, which is positioned at one area (e.g., a front end portion of an automobile) where the measurement pressure is assumed to be large, by the flexible cover film, and not to cover the other FBG portion, which is positioned at the other area (e.g., a side portion of the automobile) where the measurement pressure is assumed to be small, so that the one area on which the large pressure applies and the other area on which the small pressure applies could be simultaneously detected.

Furthermore, it is possible to easily change the shift amount (sensitivity) of the corresponding FBG portion by replacing one cover film with the other cover film having thickness and/or material different from that of the one cover film.

In another embodiment, the base film is formed with a single through hole.

In the embodiment, the optical fiber is arranged such that the plurality of FBG portions are arranged on the single through hole in plan view.

In the embodiment, a flexible cover film is preferably arranged on the first surface of the base film for covering a predetermined area of the single through hole so as to cover any of the plurality of FBG portions.

According to the configuration, it is possible to have the sensitivity of one FBG portion covered by the flexible cover film different from that of the other FBG portion not covered by the cover film. That is, the arrangement of the flexible cover film makes it possible to differ the sensitivity of the FBG portion with respect to each of the measuring points.

Therefore, it is possible to simultaneously detect the pressures at a plurality of measuring points subjected to extremely different pressures.

For instance, it is possible to cover one FBG portion, which is positioned at one area (e.g., a front end portion of an automobile) where the measurement pressure is assumed to be large, by the flexible cover film, and not to cover the other FBG portion, which is positioned at the other area (e.g., a side portion of the automobile) where the measurement pressure is assumed to be small, so that the one area on which the large pressure applies and the other area on which the small pressure applies could be simultaneously detected.

Furthermore, it is possible to easily change the shift amount (sensitivity) of the corresponding FBG portion by replacing one cover film with the other cover film having thickness and/or material different from that of the one cover film.

In the above various configurations, the optical fiber is preferably fixed to the base film at both sides of the FBG portion.

According to the configuration, it is possible to effectively prevent a positional shift of the FBG portion from the through hole.

The optical fiber may be fixed to the base film with, for example, a fixing film.

In each of the above various configurations, the optical pressure sensor may preferably include a rigid cover plate fixedly attached to the first surface of the base film directly or indirectly, the cover plate being formed with a passing hole at a position corresponding to the FBG portion.

According to the configuration, even if the optical fiber is arranged on the first surface of the base film, it is possible to prevent a bump due to the optical fiber, thereby smoothening the measuring surface. Accordingly, it is possible to detect a minute pressure change on the measuring surface without depending on the surface profile of the base film.

Furthermore, the configuration effectively prevents a positional shift of the FBG portion. In particular, in a case where pressures at a plurality of points on the smooth plane are respectively detected by the plurality of FBG portions, the arrangement of the rigid cover plate makes it possible to reliably hold the plurality of FBG portions at the respective installing positions.

A spacer film is preferably interposed between the base film and the cover plate.

The spacer film is formed with an aperture fluidly connecting the through hole and the corresponding passing hole.

According to the configuration, even if the optical fiber having a relatively large diameter is arranged on the first surface of the base film, the flexible spacer film provides a good contact between the optical fiber and the cover plate, thereby enhancing the smoothening effect by the cover plate.

In each of the above various configurations, the optical pressure sensor preferably further includes an adhesive film fixedly attached to the second surface of the base film.

The adhesive film includes, on a surface opposite the base film, an adhesive layer capable of adhering to the object body.

According to the configuration, it is possible to adhere the base film to the surface of the object body by the adhesive layer of the adhesive film, thereby easily attaching the optical pressure sensor to the object body without damaging the object body.

The FBG portion elongates and compresses in response to the temperature change, so that the Bragg wavelength is shifted. If the external temperature changes during the measurement of the external pressure, the Bragg wavelength of the pressure detecting FBG portion is shifted in response to the external temperature change in addition to the external pressure change.

In order to prevent the disadvantage, in each of the above various configurations, the optical fiber further includes a temperature compensating FBG portion, the temperature compensating FBG portion being inserted into a rigid hollow member fixed to the base film.

According to the configuration, the temperature compensating FBG portion could detect only the temperature change without being affected by the external pressure change. Therefore, it is possible to detect a net pressure change (irrespective of the temperature change) by offsetting the measurement result of the temperature compensating FBG portion from the measurement result of the pressure detecting FBG portion.

In each of the above various configurations, the base film is preferably formed with a groove at the first surface, and the optical fiber is arranged in the groove.

According to the configuration, it is possible to prevent or reduce a bump due to the optical fiber from occurring on the first surface of the base film.

Another aspect of the present invention provides, in order to achieve the second object, an optical pressure sensor including a base member fixedly attached to an object body, and an optical fiber that has at least one FBG portion and that is fixed to the base member, wherein the base member includes a sealed space in which a surface facing an external pressure to be measured is covered with a flexible first cover film, the optical fiber is fixed to the base member at a region other than the FBG portion such that the FBG portion is positioned on the sealed space with the FBG portion contacted to an inner surface of the first cover film, and the change of reflection characteristic of the FBG portion is detected in a state where the sealed space is maintained at a reference pressure.

In the thus configured optical pressure sensor, the change of reflection characteristic of the FBG portion (the shift amount of Bragg wavelength by distortion of the FBG portion) of the optical fiber contacting the inner surface of the first cover film could be detected in a state where the sealed space is maintained at the reference pressure (in a state where the sealed space is preset to the reference pressure).

That is, according to the configuration, it is possible to detect the external pressure change as a differential pressure with reference to the reference pressure.

For example, the FBG portion may be wholly positioned on the sealed space (i.e., the FBG portion is positioned such that the whole FBG portion is not contacted to the base member). According to the configuration, it is possible to effectively prevent the base member from hindering or attenuating the strain action of the FBG portion caused by the pressure change. Therefore, it is possible to detect a more minute pressure change in comparison with the conventional optical pressure sensor in which the bending of the base film is detected by the FBG portion.

Alternatively, the FBG portion may be partially positioned on the sealed space. According to the configuration, it is possible to lower the sensitivity of the FBG portion in comparison with the one embodiment, thereby detecting the pressure at a portion of the object body subjected to a more high pressure.

Preferably, the FBG portion is fixedly attached to the inner surface of the first cover film such that a bending of the FBG portion follows a bending of the first cover film caused by a change of the external pressure with respect to the reference pressure.

According to the configuration, when the first cover film bends due to the external pressure change with respect to the reference pressure in the sealed space, the FBG follows the bending of the first cover film to bend. Accordingly, it is possible to accurately detect a more minute pressure change.

Further, according to the configuration, it is possible to effectively detect the external pressure change, even if the external pressure changes so as to be lower than the reference pressure (i.e. the external pressure changes in a negative direction).

Preferably, the base member has a flexible base film that includes first and second surfaces and a through hole passing through the first and second surfaces, the second surface being closely attached to a surface of the object body directly or indirectly; the first cover film fixedly attached to the first surface of the base film so as to cover one end of the through hole; and a flexible second cover film fixedly attached to the second surface of the base film so as to cover the other end of the through hole for forming the sealed space in cooperation with the first cover film. The optical fiber is interposed between the first surface of the base film and the first cover film such that the FBG portion is positioned on the through hole in plan view.

According to the configuration, it is possible to detect the pressure changes on surfaces of the object body having various shapes as the differential pressure.

The optical fiber preferably includes a plurality of the FBG portions that have different reflection characteristics one another and that are arranged along a longitudinal direction of the optical fiber.

In one embodiment, the base film is formed with a plurality of the through holes and a slit fluidly connecting the plurality of through holes from one another.

The optical fiber is arranged such that each of the plurality of FBG portions is arranged on the corresponding through hole of the plurality of the through holes in plan view.

The first and second cover films are respectively fixed to the first and second surfaces so as to cover the plurality of through holes and the slit.

The base film is further formed with an external communicating slit having a first end fluidly connected to the sealed space that is defined by the plurality of through holes and the slit and a second end opened to the outside.

According to the one embodiment, it is possible to easily detect the differential pressures at a plurality of (a large number of) points without using tubes needed in the conventional piezoelectric or semiconductor pressure sensor by measuring the shift amount of each of the preset Bragg wavelengths. Further, it is possible to easily maintain the pressure in the sealed space at a constant pressure through the external communicating slit since the sealed space is opened to the outside through the external communicating slit.

In another embodiment, the base film is formed with a single through hole.

The optical fiber is arranged such that the plurality of FBG portions are arranged on the single through hole in plan view.

The base film is further formed with an external communicating slit having a first end fluidly connected to the single through hole and a second end opened to the outside.

According to another embodiment, it is also possible to easily detect the differential pressures at a plurality of (a large number of) points without using tubes needed in the conventional piezoelectric or semiconductor pressure sensor by measuring the shift amount of each of the preset Bragg wavelengths. Further, it is possible to easily maintain the pressure in the sealed space at a constant pressure through the external communicating slit since the sealed space is opened to the outside through the external communicating slit.

The base film is preferably formed with a groove at the first surface, and the optical fiber is arranged in the groove.

According to the configuration, it is possible to prevent or reduce a bump due to the optical fiber from occurring on a surface of the optical pressure sensor positioned on a side at which the external pressure is detected.

Alternatively, the first cover film may be formed with a groove at the inner surface, and the optical fiber is arranged in the groove.

According to the configuration, it is also possible to prevent or reduce a bump due to the optical fiber from occurring on a surface of the optical pressure sensor positioned on a side the external pressure is detected.

In each of the above various configurations, the optical fiber preferably further includes a temperature compensating FBG portion, the temperature compensating FBG portion being inserted into a rigid hollow member fixed to the rigid base member.

According to the configuration, it is possible to detect a net pressure change (irrespective of the temperature change) by offsetting the measurement result of the temperature compensating FBG portion from the measurement result of the pressure detecting FBG portion.

Still another aspect of the present invention provides, in order to achieve the second object, an optical pressure sensor including a base member fixedly attached to an object body, and an optical fiber that has at least one FBG portion and that is fixed to the base member, wherein the base member includes a sealed space in which a surface facing an external pressure to be measured is covered with a flexible first cover film, the optical fiber is fixed to the base member at a region other than the FBG portion such that the FBG portion is positioned on the sealed space with the FBG portion contacted to an outer surface of the first cover film, and the change of reflection characteristic of the FBG portion is detected in a state where the sealed space is maintained at a reference pressure.

In the thus configured optical pressure sensor, the change of reflection characteristic of the FBG portion (the shift amount of Bragg wavelength by distortion of the FBG portion) of the optical fiber contacting the outer surface of the first cover film could be detected in a state where the sealed space is maintained at the reference pressure (in a state where the sealed space is preset to the reference pressure).

That is, according to the configuration, it is possible to detect the external pressure change as a differential pressure with reference to the reference pressure.

For example, the FBG portion may be wholly positioned on the sealed space (i.e., the FBG portion is positioned such that the whole FBG portion is not contacted to the base member). According to the configuration, it is possible to effectively prevent the base member from hindering or attenuating the strain action of the FBG portion caused by the pressure change. Therefore, it is possible to detect a more minute pressure change in comparison with the conventional optical pressure sensor in which the bending of the base film is detected by the FBG portion.

Alternatively, the FBG portion may be partially positioned on the sealed space. According to the configuration, it is possible to lower the sensitivity of the FBG portion in comparison with the one embodiment, thereby detecting the pressure at a portion of the object body subjected to a more high pressure.

Preferably, the base member has a flexible base film that includes a first surface on which an external pressure applies and a second surface closely attached to a surface of the object body directly or indirectly, the base film including a through hole passing through the first and second surfaces; the first cover film fixedly attached to the first surface of the base film so as to cover one end of the through hole; and a flexible second cover film fixedly attached to the second surface of the base film so as to cover the other end of the through hole for forming the sealed space in cooperation with the first cover film. The optical fiber is fixed to the outer surface of the first cover film such that the FBG portion is positioned on the through hole in plan view.

In the preferred configuration, the base member has the flexible base film that includes the first and second surfaces and the through hole passing through the first and second surfaces. The first and second cover films are fixedly attached to the base film so as to respectively cover one end and the other end of the through hole to form the sealed space. The optical fiber is fixed to the outer surface of the first cover film such that the FBG portion is positioned on the through hole in plan view. The change of reflection characteristic of the FBG portion (the shift amount of Bragg wavelength by distortion of the FBG portion) of the optical fiber contacting the outer surface of the first cover film in order to detect the external pressure change on the outer surface of the first cover film is detected in a state where the second surface of the base film is closely attached to the surface of the object body directly or indirectly and the sealed space is maintained at the reference pressure (or the sealed space is preset to the reference pressure).

According to the configuration, it is possible to detect the pressure changes on surfaces of the object body having various shapes as the differential pressure.

The first cover film is preferably formed with a groove at the outer surface, and the optical fiber is arranged in the groove.

According to the configuration, it is possible to prevent or reduce a bump due to the optical fiber from occurring on the outer surface of the first cover film forming an outer surface of the optical pressure sensor positioned on a side at which the external pressure is detected.

In each of the above various configurations, a hollow reinforcing member is preferably arranged in the through hole, the reinforcing member has rigidity higher than the base film, and the optical fiber is arranged such that the FBG portion is positioned on a hollow portion of the reinforcing member in plan view.

According to the configuration, it is possible to enhance stability of the FBG portion and the base film.

BRIEF DESCRIPTION OF THE DRAWINGS

FIG. 1 is a schematic plan view of an optical pressure sensor according to a first embodiment of the present invention.

FIG. 2(a) is a partially enlarged view of a region II(a) of FIG. 1.

FIG. 2(b) is a cross sectional view taken along a line II(b)-II(b) of FIG. 2(a).

FIG. 5 is an exploded perspective view of an optical pressure sensor according to a variation of the first embodiment.

FIG. 10(a) is a plan view of an optical pressure sensor according to still another variation of the first embodiment.

FIG. 10(b) is a plan view of an optical pressure sensor according to still another variation of the first embodiment.

FIG. 12 is a plan view of an optical pressure sensor according to a second embodiment of the present invention.

FIG. 13(a) is a partially enlarged view of a region XIII(a) of FIG. 12.

FIG. 13(b) is a cross sectional view taken along a line XIII(b)-XIII(b) of FIG. 13(a).

FIG. 13(c) is a cross sectional view taken along a line XIII(c)-XIII(c) of FIG. 13(a).

FIG. 18 is a cross sectional view of the optical pressure sensor according to the variation shown in FIG. 17.

FIG. 18(a) shows an initial state when no external pressure is applied.

FIG. 18(b) shows a state where a positive external pressure is applied.

FIG. 18(c) shows a state where a negative external pressure is applied.

FIG. 19 is a plan view of a usage example where a plurality of the optical pressure sensors are connected in series.

FIG. 23 is a cross sectional view of the optical pressure sensor according to the first embodiment in a state where the optical fiber is arranged in a groove formed at a first surface of a base film.

FIGS. 23(a) and 23(b) are cross sectional views taken along a line XXIII(a)-XXIII(a) and a line XXIII(b)-XXIII(b), respectively, in FIG. 1.

FIG. 24(a) is a cross sectional view of the optical pressure sensor according to the first embodiment in a state where the optical fiber is arranged in a groove formed at an inner surface of a cover film.

FIG. 24(b) is a cross sectional view of the optical pressure sensor according to the first embodiment in a state where the optical fiber is arranged in a groove formed at an outer surface of the cover film.

FIG. 26(a) is a partial plan view of a variation of the optical pressure sensor according to the present invention, in which a reinforcing member is arranged in the through hole.

FIG. 26(b) is a cross sectional view taking along a line XXVI(b)-XXVI(b) in FIG. 26(a).

DETAILED DESCRIPTION OF THE PREFERRED EMBODIMENTS

First Embodiment

Figure 3:
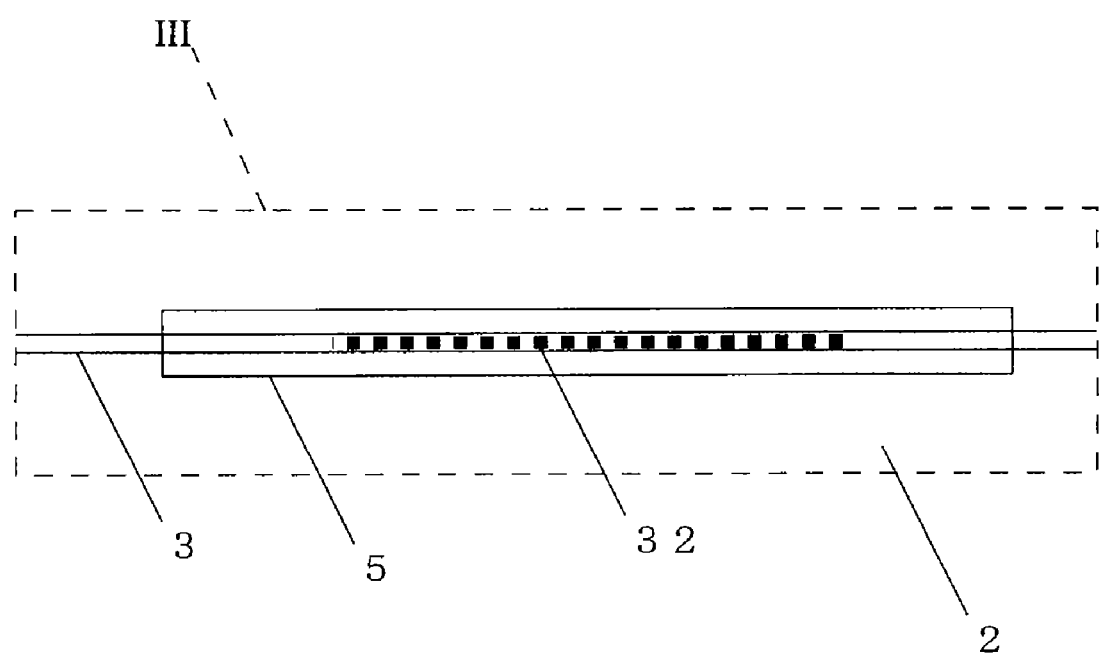
FIG. 3 is a partially enlarged view of a region III in FIG. 1.

A preferred embodiment of an optical pressure sensor according to the present invention will now be described with reference to the accompanying drawings.

FIG. 1 is a schematic plan view of an optical pressure sensor according to a first embodiment of the present invention. FIG. 2(a) is a partially enlarged view of a region II(a) of FIG. 1, and FIG. 2(b) is a cross sectional view taken along a line II(b)-II(b) of FIG. 2(a).

As shown in FIGS. 1 and 2, the optical pressure sensor 100A according to the present embodiment includes a base film 2 having a first surface 2a and a second surface 2b (only the first surface 2a is shown in FIG. 1), the second surface 2b being closely attached to a surface of an object body directly or indirectly, and an optical fiber 3 fixed to the base film 2.

In the present embodiment, the optical fiber 3 is fixed to the first surface 2a, which is on a side opposite the object body, of the base film 2.

In place of the configuration, the optical fiber 3 may be embedded within the base film 2.

The optical fiber 3 includes an FBG portion 31. The FBG portion 31 has a diffraction grating configuration in which the refractive index of a core part of the optical fiber is periodically changed, and is configured to reflect only components having a predetermined wavelength (a Bragg wavelength) out of an incident light entering the optical fiber 3. A probe 4 is attached to a first end of the optical fiber 3, and a light source and a photodetector (both are not shown) are attached by way of the probe 4. Out of the incident light entering the optical fiber from the light source though the probe 4, a light having the wavelength is reflected by the FBG portion 31 and returned so that the photodetector detects the wavelength of the light.

Specifically, when the FBG portion 31 strains due to an external pressure change, the grating pitch of the diffraction grating of the FBG portion 31 expands and contracts according to the strain of the FBG portion 31 so that the Bragg wavelength to be reflected is shifted. Therefore, it is possible to detect a strain amount of the FBG portion 31, that is, an amount of the pressure applying on the FBG portion 31 by detecting the shift amount of the Bragg wavelength.

It is possible to attach another probe to a second end of the optical fiber 3 opposite the first end to which the probe 4 is attached, and to respectively attach the light source to the first end and the photodetector to the second end through the respective proves. In such a configuration, the photodetector detects the wavelength of the incident light that is not passed through the FBG portion 31 so that the pressure is detected.

In the present embodiment, the optical fiber 3 includes a plurality of (five in the illustrated embodiment) of FBG portions 31 arranged along a longitudinal direction of the optical fiber 3, the plurality of FBG portion 31 having different reflection characteristics one another.

The base film 2 is formed with through holes 21 as many as the FBG portion 31, the through holes 21 passing through the first surface 2a and the second surface 2b.

The optical fiber 3 is arranged such that each of the plurality of FBG portions 31 is positioned on the corresponding through hole 21 in plan view.

It is obviously possible that the optical fiber 3 includes only one FBG portion 31 or more than five or less than five FBG portions 31.

In a case where the plurality of FBG portions 31 are arranged in the optical fiber 3 as in the present embodiment, the plurality of FBG portions 31 are configured so as to have different reflection characteristics (Bragg wavelengths) from one another.

For example, one FBG portion 31 may be set to have the Bragg wavelength of 1520 nm in a state (an initial state) where no pressure change occurs, and the remaining FBG portions 31 may be set to have the Bragg wavelengths (1521 nm, 1522 nm, . . . ) that are sequentially increased by 1 nm from one another in the initial state. In this case, the incident light from the light source is set to have a wavelength including all the Bragg wavelengths of the plurality of FBG portions 31. That is, it is configured that the light having the wavelength of 1520 nm to 1570 nm enters the optical fiber 3 from the light source.

The measurement of the shift amounts of the Bragg wavelengths of the respective plural FBG portions 31 with the configuration makes it possible to easily detect the pressures at a plurality of (a large number of) points without using tubes needed in the conventional piezoelectric or semiconductor pressure sensor, thereby detecting more specific pressure changes at a plurality of points over a wide area.

In the present embodiment, the optical fiber 3 is provided with a temperature compensating FBG portion 32, as shown in FIG. 1. FIG. 3 shows a partially enlarged view of a region III in FIG. 1.

The temperature compensating FBG portion 32 is inserted into a rigid hollow member 5 fixed to the base film 2. In the present embodiment, the optical fiber 3 is fixed to the first surface 2a of the base film 2, as described above. Therefore, the hollow member 5 is also fixed to the first surface 2a of the base film 2.

The hollow member 5 has such rigidity that prevents the hollow member 5 from being deformed by the external pressure and has such an inner diameter that allows the optical fiber 3 to slidably move within the hollow member 5. The hollow member 5 may be an aluminum pipe.

It is possible to distinguish a error component which is caused by an external temperature change from the measurement value of the FBG portion 31 by arranging the FBG portion 32 in the rigid hollow member 5 in a slidably movable manner as described above, thereby detecting an accurate pressure value.

In other words, the FBG portion 31 strains in response to both a pressure change and a temperature change so that the Bragg wavelength is shifted. On the other hand, the temperature compensating FBG portion 32 strains in response to only the temperature change without being subjected to the pressure change since it is arranged within the hollow member 5.

Therefore, it is possible to detect a net pressure change (irrespective of the temperature change) by offsetting the measurement result of the temperature compensating FBG portion 32 from the measurement result of the pressure measurement FBG portion 31.

As shown in FIG. 1, only one temperature compensating FBG portion 32 is arranged on the one base film 2 in the present embodiment, but obviously, a plurality of the FBG portions 32 may be arranged. The installing position of the temperature compensating FBG portion 32 is not particularly limited, but the FBG portion 32 is preferably arranged close to the FBG portion 31 to an extent such that the FBG portion 32 is subjected to the same temperature condition as the pressure measurement FBG portion 31.

The hollow member 5 preferably has an inner diameter close as much as possible to the outer diameter of the optical fiber 3 within a range in which the optical fiber 3 can slidably move within the hollow member 5. Such a configuration could effectively prevent the FBG portion 32 from straining in the radial direction while allowing the FBG portion 32 to elongate or compress in the longitudinal direction in response to the temperature change.

Figure 4:
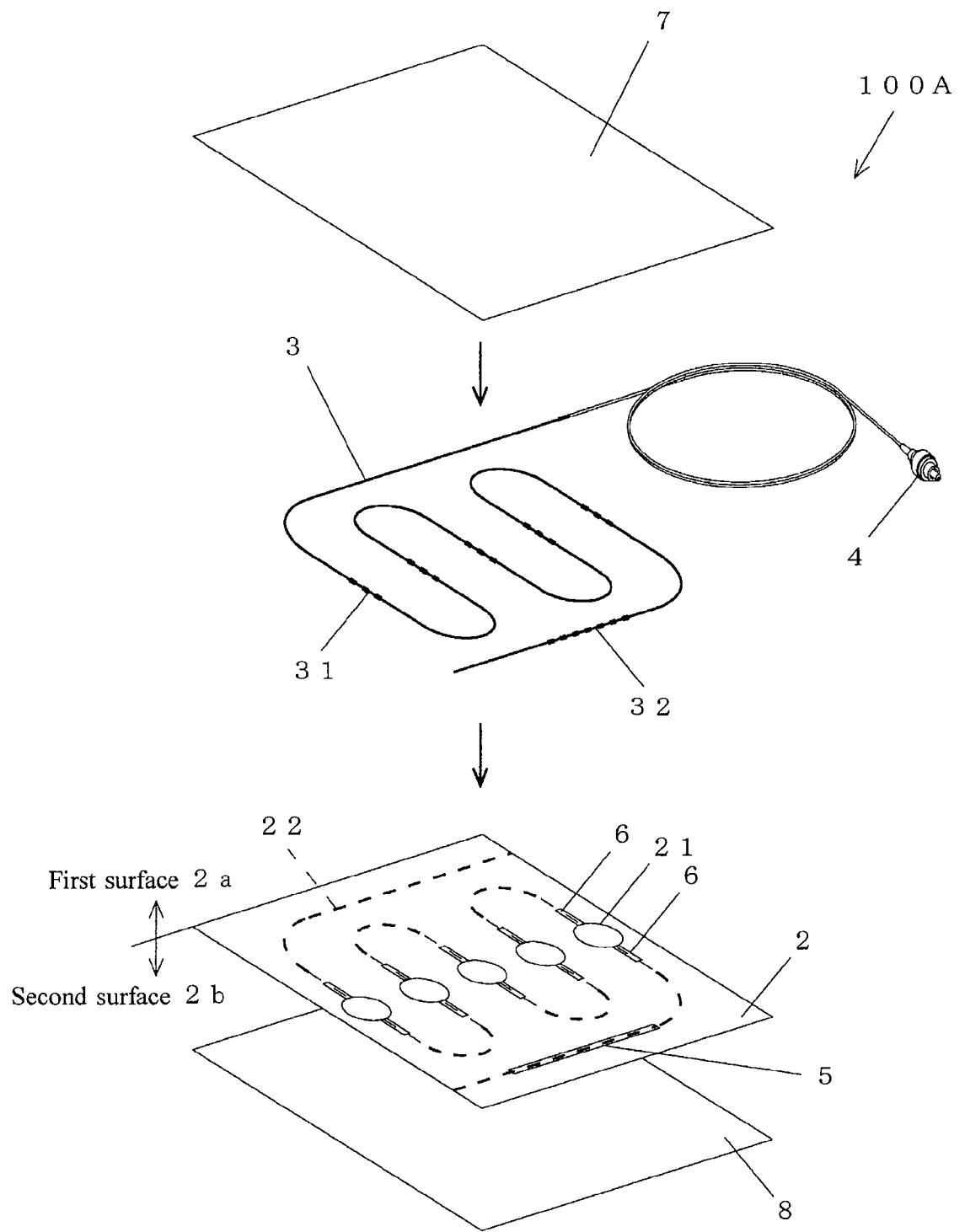
FIG. 4 is an exploded perspective view of the optical pressure sensor according to the first embodiment.

FIG. 4 shows an exploded perspective view of the optical pressure sensor 100A.

The base film 2 may be a flexible film having a film thickness of about 30 μm to 500 μm, for example. Examples of such flexible films include polyester films and flexible impact absorbing materials.

According to such a configuration, the optical pressure sensor 100A can be closely attached to the object body even when the surface of the object body is not planar, and thus the pressure measurement can be carried out with high accuracy.

Furthermore, in a case where the impact absorbing material is used as the base film 2, the base film 2 can absorb the impact from the outside, thereby preventing the optical fiber 3 from being damaged due to the impact. Moreover, the configuration could alleviate stress concentration on the optical fiber 3 even when the base film 2 is attached to the object body with being forcibly deformed.

In the optical pressure sensor 100A according to the present embodiment, it is possible to thicken the base film 2 to an extent (e.g., about 0.5 to 1.0 mm) such that the attachment of the base film 2 to the object body is not affected, since the measurement value of the FBG portion 31 is not directly influenced by the thickness and the hardness of the base film 2, as will be described later, thereby enhancing the durability of the optical pressure sensor 100A.

The base film 2 is formed with through holes 21 passing through the first surface 2a and the second surface 2b. The shape of the through hole 21 is not particularly limited to, but is preferably a shape having a diameter substantially the same as or slightly larger than the axial length of the FBG portion 31 of the optical fiber 3 to be attached.

The optical fiber 3 is fixed to the base film 2 (at the first surface 2a in the present embodiment) at a region other than the FBG portion 31 so that the FBG portion 31 is positioned on the corresponding through hole 21 in plan view (FIG. 1).

In the present embodiment, the optical fiber 3 is firmly fixed to the first surface 2a of the base film 2 at both sides of the FBG portion 31 by fixing films 6.

The fixing film 6 may be a double-faced tape interposed between the first surface 2a and the optical fiber 3 to firmly fix the first surface 2a and the optical fiber 3, or may be an adhesive tape attached from above after arranging the optical fiber 3 on the first surface 2a.

An aluminum film may be used as the fixing film 6. In this case, the optical fiber 3 may be arranged on the aluminum film to prevent the optical fiber 3 from sliding.

In place of using the fixing film 6, the optical fiber 3 may be fixed to the base film 2 with an adhesive.

The temperature compensating FBG portion 32 is also fixed to the base film 2 by using the same configuration as that for the FBG portion 31.

Specifically, as shown in FIGS. 1 and 2, the optical fiber 3 is fixed to the base film 2 at both sides of the through hole 21, on which the FBG portion 31 is positioned, in the longitudinal direction of the optical fiber 3.

The positional shift of the FBG portion 31 with respect to the through hole 21 can be effectively prevented by fixing the optical fiber 3 to the base film 2 at both sides of the FBG portion 31.

More preferably, the optical fiber 3 is fixed to the base film 2 at both sides of the FBG portion 31 with tensile force in the longitudinal direction applied to the FBG portion 31, so that the Bragg wavelength in the initial state (where no pressure change occurs) can be stabilized.

The strain amount of the FBG portion 31 and the shift amount of the Bragg wavelength reflected by the FBG portion 31 are in a proportional relationship. Therefore, the FBG portion 31 can be prevented from being unintentionally strained in the initial state where no pressure change occurs by fixing both sides of the FBG portion 31 with a predetermined magnitude of tensile force applied to the FBG portion 31, whereby the Bragg wavelength in the initial state can be stabilized.

The portion of the optical fiber 3 other than the both sides of the FBG portion 31 does not necessarily have to be fixed.

In the configuration in which the plurality of FBG portions 31 are respectively positioned on the corresponding through holes 21 as in the present embodiment, it is possible to arrange a region of the optical fiber 3 between the adjacent FBG portions 31 in a curve shape so as to be positioned in the same plane as the adjacent FBG portions 31, and to arrange a region of the optical fiber 3 positioned on an outer side in the longitudinal direction than one FBG portion 31, which is positioned at an end in the longitudinal direction of the optical fiber 3, on a region of the base film 2 different from the through hole 21 so as to be positioned in the same plane as the one FBG portion 31, as shown with a broken line 22 in FIG. 4. With the configuration, it is possible to prevent the bumps due to the optical fiber 3 from increasing on the measuring surface.

It is of course possible to firmly fix the portion of the optical fiber 3 other than the both sides of the FBG portion 31 to the base film 2 with an adhesive or the like.

A groove in which the optical fiber 3 is at least partially positioned may be arranged along the broken line 22 of FIG. 4 so that the bumps on the measuring surface due to the outer diameter of the optical fiber 3 are reduced as much as possible to enhance the measurement accuracy.

FIG. 23 shows a cross sectional view of the optical pressure sensor in which the groove 22a is formed in the first surface 2a of the base film 2, and the portion of the optical fiber 3 located other than on the through hole 21 in plan view is arranged in the groove 22a. FIGS. 23(a) and 23(b) are cross sectional views taken along a line XXIII(a)-XXIII(a) and a line XXIII(b)-XXIII(b), respectively, in FIG. 1.

As shown in FIG. 23, the arrangement of the optical fiber 3 in the groove 22a makes it possible to prevent or reduce the optical fiber 3 from projecting outward from the outer surface of the base film 2, whereby the bumps on the measuring surface can be prevented or reduced.

In the present embodiment, the first surface 2a of the base film 2 is covered by a flexible cover film 7 with the optical fiber 3 arranged on the base film 2, as shown in FIG. 4. An example of the cover film 7 is a polyester film.

The arrangement of the cover film 7 makes it possible to smoothen the measuring surface, thereby reducing the measurement error to enhance measurement accuracy. Please note that the cover film 7 doses not affect the following property of the optical pressure sensor 100A with respect to the object body since the cover film 7 is a flexible film.

In FIG. 4, the cover film 7 is configured to cover the entire surface of the base film 2.

In such a configuration, since the bending of the FBG portion 31 of the optical fiber 3 follows the bending of the cover film 7 by an external pressure, the sensitivity of the FBG portion 31 slightly lowers compared to the configuration in which the cover film 7 is not arranged. However, the FBG portion 31 is positioned within the through hole 21, as described above. That is, there is a space, which is formed by the through hole 21, between the portion of the cover film 7 contacting the FBG portion 31 and the object body. Therefore, it is possible to enhance the sensitivity of the FBG portion 31 and effectively detect a more minute pressure change in comparison with the conventional configuration in which the pressure is detected based on the deformation of the FBG portion involved in the deformation of the base film itself.

The cover film 7 preferably has a thickness (e.g., 0.05 mm) less than that of the base film 2.

In FIG. 4, the cover film 7 is a single film that covers the entire surface of the base film 2, but in place thereof, a plurality of films that covers the through hole 21 individually may be used as the cover film 7.

Furthermore, in place of the configuration shown in FIG. 4, the cover film 7 may have an opening at a region corresponding to the whole or part of the FBG portion 31, so that the whole or part of the FBG portion 31 is not covered by the cover film 7.

According to such a configuration, the measurement sensitivity in the FBG portion 31 can be prevented from being lowered by the cover film 7 while enhancing the smoothness of the measuring surface by the cover film 7.

In a case where the cover film 7 covers the entire surface of the base film 2 as in the present embodiment, the cover film 7 may be formed with a groove in which the optical fiber 3 is at least partially arranged.

Specifically, the cover film 7 may be formed with a groove 71a at a region of the inner surface (a surface facing the base film 2) of the cover film 7 corresponding to the optical fiber 3, and the optical fiber 3 may be arranged within the groove 71a, as shown in FIG. 24(a). Alternatively, the cover film 7 may be formed with a groove 72a, in which the optical fiber 3 is at least partially arranged, on the outer surface of the cover film 7, as shown in FIG. 24(b).

As shown in FIGS. 2(b) and 4, the optical pressure sensor 100A according to the present embodiment further includes an adhesive film 8 firmly fixed to the second surface 2b of the base film 2.

The adhesive film 8 has an adhesive layer that can adhere to the object body and that is on an opposite surface of the adhesive film 8 as the base film 2.

The adhesive film 8 is attached to the second surface 2b of the base film 2 on a side close to the object body with, e.g., an adhesive.

The arrangement of the adhesive film 8 makes it possible to directly adhere the optical pressure sensor 100A to the surface to be measured of the object body. Therefore, the optical pressure sensor 100A can be easily attached without damaging the object body (without processing the object body).

In the present embodiment, the cover film 7 and the adhesive film 8 that are attached on both surfaces of the base film 2 close the through hole 21 formed in the base film 2 to form a sealed space. The configuration makes it possible to enhance the sensitivity of the FBG portion 31 since the FBG portion also bends in response to the difference between the internal pressure of the sealed space and the external pressure.

The adhesive layer of the adhesive film 8 is preferably configured to be strippable with respect to the object body (have low viscosity). Thus, the optical pressure sensor 100A can be easily detached from the object body without damaging the object body after the measurement, and both the object body and the optical pressure sensor 100A can be reused.

The adhesive film 8 is also preferably a flexible film (e.g., a polyester film) so that following property of the optical pressure sensor 100A with respect to the object body is not affected due to the adhesive film 8.

An optical pressure sensor 100B according to a variation of the present embodiment will now be described.

FIG. 5 shows an exploded perspective view of the optical pressure sensor 100B.

As shown in FIG. 5, in the optical pressure sensor 100B, the cover film 7 and the base film 2 are integrally formed to each other.

That is, the optical pressure sensor 100B includes a single film forming the cover film 7 and the base film 2. The single film is folded with the optical fiber 3 including the FBG portions 31, 32 sandwiched between one part forming the cover film 7 and the other part forming the base film 2.

As described above, in the optical pressure sensors 100A, 100B, the base film 2 is formed with the through hole 21 that passes through the first surface 2a and the second surface 2b, and the optical fiber 3 is fixed to the base film 2 by the fixing film 6 at the region other than the FBG portion 31 with the FBG portion 31 functioning as a pressure sensitive part positioned on the through hole 21 in plan view.

When measuring the pressure acting on the object body, the optical pressure sensors 100A, 100B with such a configuration are attached to the object body in a state that the second surface 2b of the base film 2 directly or indirectly face the surface of the object body.

Therefore, the FBG portion 31 functioning as the pressure sensitive part can directly detect the pressure change on the surface of the first surface 2a that is the measuring surface.

Furthermore, since the FBG portion 31 is arranged on the through hole 21 of the base film 2, the distortion of the FBG portion 31 will not be hindered or attenuated by the base film 2. That is, the FBG portion 32 bends irrespective of the base film 2 and the object body. Therefore, according to the optical pressure sensors 100A, 100B, a more minute pressure change can be detected compared to the conventional optical pressure sensor detecting the pressure change based on the bending of the base film 2.

A plurality of the optical pressure sensors 100A, 100B may be connected, for example in series, to carry out pressure measurement over a wide area.

Figure 6:
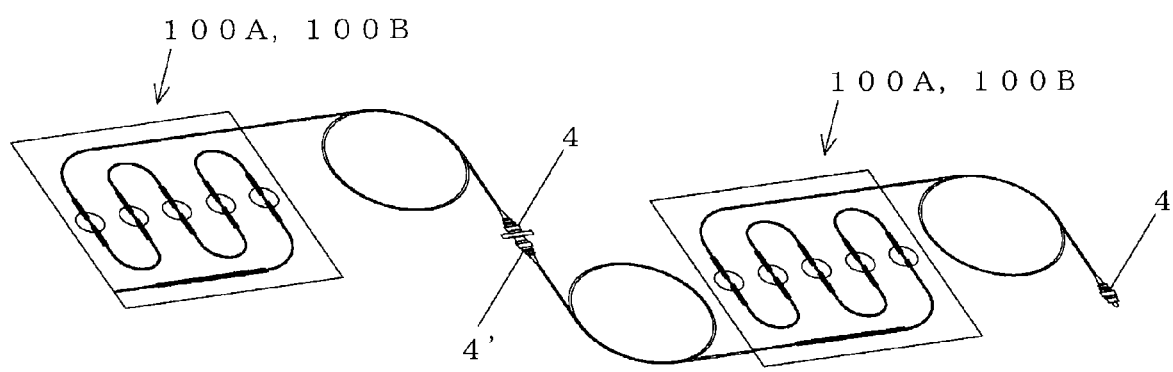
FIG. 6 is a plan view showing a usage example where a plurality of the optical pressure sensors are connected in series.

FIG. 6 shows a usage example where a plurality of the optical pressure sensors 100A, 100B are connected in series.

In the usage example shown in FIG. 6, each of the optical pressure sensors 100A, 100B includes the probe 4 and a probe 4' connectable to the probe 4 respectively arranged at first and second ends of the optical fiber 3.

The probe 4' in one optical pressure sensor 100A, 100B is connected to the probe 4 in another optical pressure sensor 100A, 100B, so that all of the FBG portions 31 of the plurality of optical pressure sensors 100A, 100B are connected in series.

The pressures of a large number of measuring points can be simultaneously measured with one channel by connecting the plurality of unitized optical pressure sensors 100A, 100B as described above.

Please note that the measurement can be performed without deteriorating measurement accuracy even if such a connection is made, since the incident light is less attenuated in the optical fiber 3.

Figure 25:
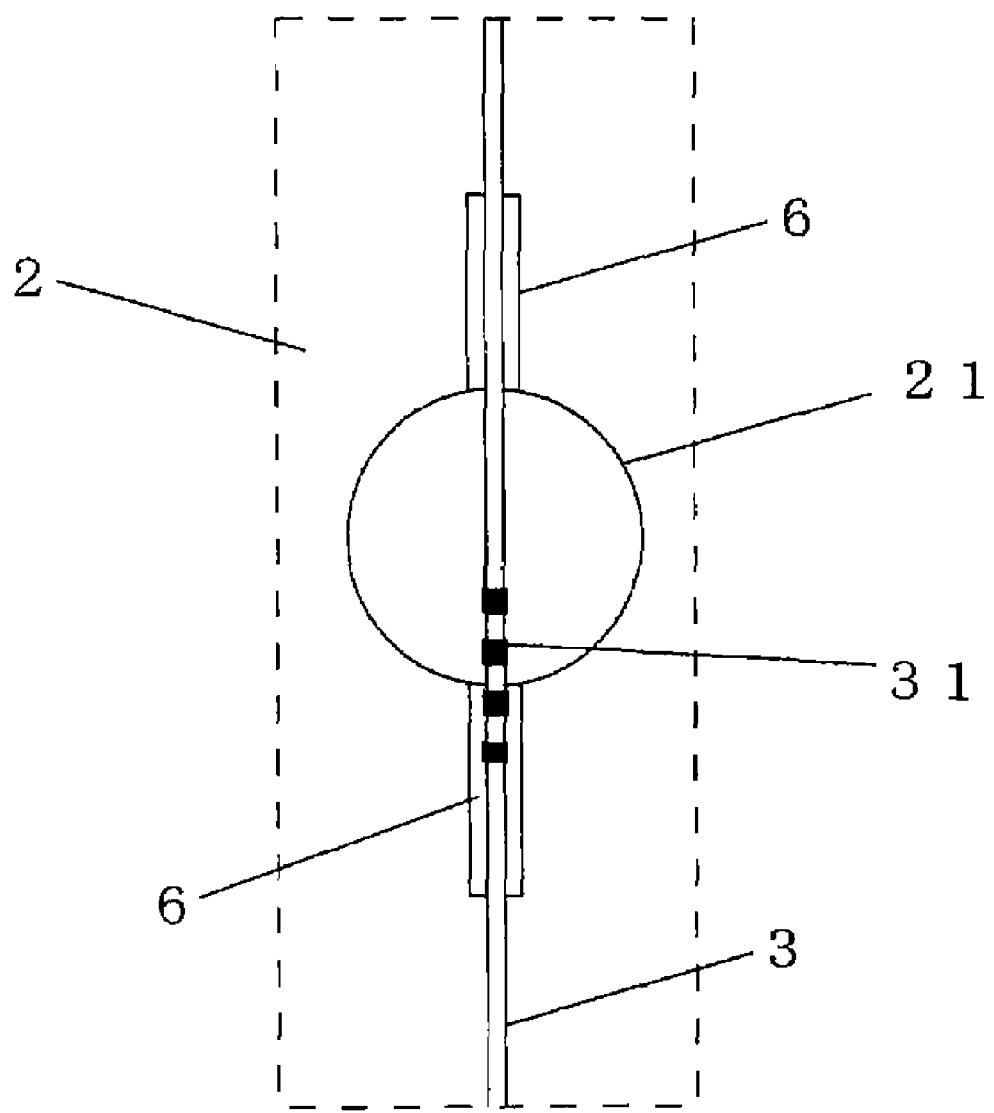
FIG. 25 is a partial plan view of the optical pressure sensor according to the present invention in a state where the optical fiber is partially arranged on the through hole.

The configuration in which the FBG portion 31 is positioned on the through hole 21 in plan view includes a configuration in which a portion of the FBG portion 31 is positioned on the through hole 21, as shown in FIG. 25, in addition to the configuration in which the entire region of the FBG portion 31 is positioned on the through hole 21, as shown in FIGS. 1 and 2.

Positioning only a portion of the FBG portion 31 on the through hole 21, as shown in FIG. 25, can lower the sensitivity of the FBG portion 31.

That is, the sensitivity of the FBG portion 31 can be adjusted by adjusting the length of the portion of the FBG portion 31 positioned on the through hole 21.

Therefore, the measurable pressure range can be substantially widened by appropriately changing the length of the portion of the FBG portion positioned on the through hole 21 in accordance with the magnitude of the expected pressure at the measurement point.

Furthermore, the above configuration has an effect of reducing the generation of extra noise due to overreaction of the FBG portion 31.

The present embodiment has been described taking the configuration in which the base film 2, the cover film 7 and the adhesive film 8 have flexibility as an example, but the present invention is not limited thereto.

For example, in a case where the measuring surface is a plane, a rigid base member made of resin material or metal material may be used in place of the base film 2.

Furthermore, a rigid cover plate 9 firmly fixed to the first surface 2a of the base film (or the base member) in a direct or indirect manner may be arranged in place of the cover film 7.

Figure 7:
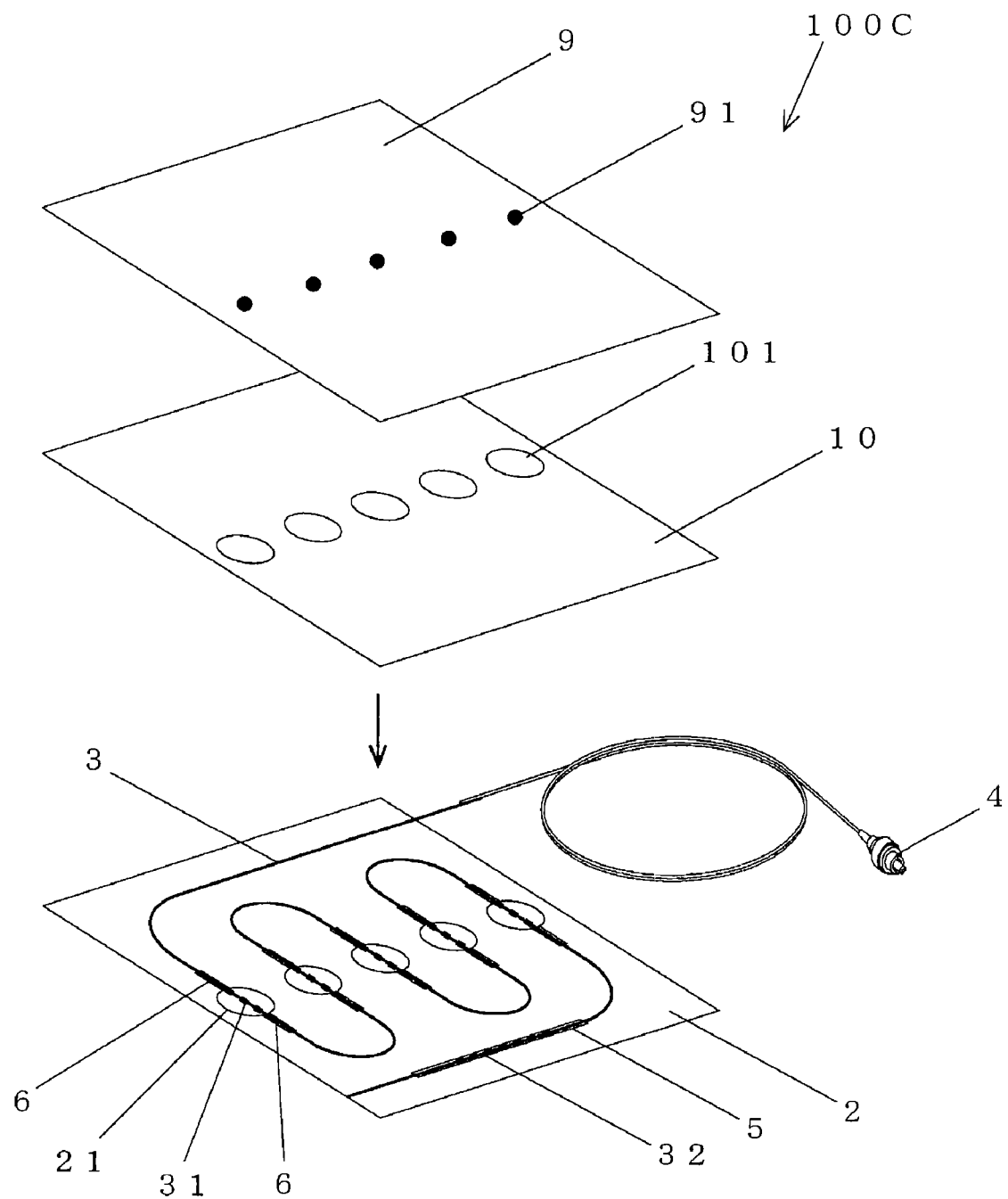
FIG. 7 is an exploded perspective view of an optical pressure sensor according to another variation of the first embodiment.

FIG. 7 shows an exploded perspective view of an optical pressure sensor 100C according to another variation of the present embodiment.

As shown in FIG. 7, the optical pressure sensor 100C includes the rigid cover plate 9 in place of the cover film 7.

Examples of the cover plate 9 include an aluminum plate.

The cover plate 9 is formed with passing holes 91 at positions corresponding to the FBG portions 31.

In the optical pressure sensor 100C, the cover plate 9 is securely fixed in an indirect manner to the first surface 2a of the base film 2 by way of a flexible spacer film 10.

The spacer film 10 interposed between the base film 2 and the cover plate 9 is preferably formed with holes 101 for fluidically connecting the passing holes 91 and the corresponding through holes 21.

The passing hole 91 in the rigid cover plate 9 may have a diameter substantially the same as or smaller than that of the through hole 21 of the base film 2.

According to the optical pressure sensor 100C, the rigid cover plate 9 eliminates the bumps on the surface due to the diameter of the optical fiber 3 arranged on the first surface 2a of the base film 2 and the like, thereby smoothening the measuring surface.

Further, the flexible spacer film 10E can enhance the contact between the cover plate 9 and the base film 2 even when the diameter of the optical fiber 3 attached to the first surface 2a of the base film 2 is relatively large, thereby increase the effectiveness of the smoothening function by the cover plate 9. Accordingly, it is possible to detect a minute pressure change without depending on the surface profile of the base film 2.

In a case where pressures at a plurality of points on the smooth plane are respectively detected by the plurality of FBG portions 31, the arrangement of the rigid cover plate 9 makes it possible to reliably hold the plurality of FBG portions 31 at the respective installing positions.

In the case where the spacer film 10 is interposed, a single film, which is folded to form the spacer film 10 and the base film 2, may be used, similarly to the configuration shown in FIG. 5.

Although the through holes 21 of the same number as the FBG portions 31 of the optical fiber 3 are formed in the present embodiment, the present invention is not limited to such configuration.

Figure 8:
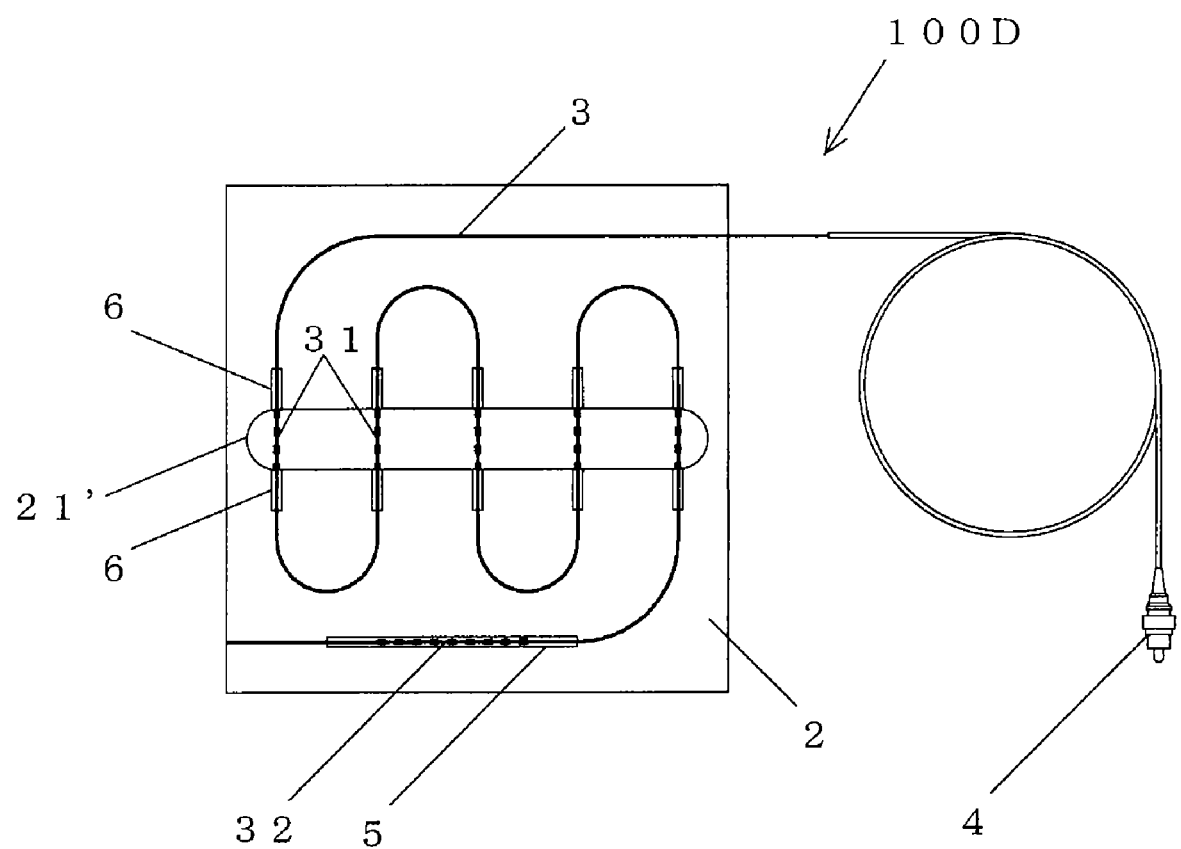
FIG. 8 is a plan view of an optical pressure sensor according to still another variation of the first embodiment.

FIG. 8 shows a plan view of an optical pressure sensor 100D according to still another variation of the present embodiment.

As shown in FIG. 8, the optical pressure sensor 100D is configured so that the base film 2a is formed with a single through hole 21', and the optical fiber 3 is arranged such that the plurality of FBG portions 31 are positioned on the single through hole 21' in plan view.

Alternatively, the base film 2 may be formed with a plurality of through holes, each of the through holes corresponding to some FBG portions 31.

Figure 9:
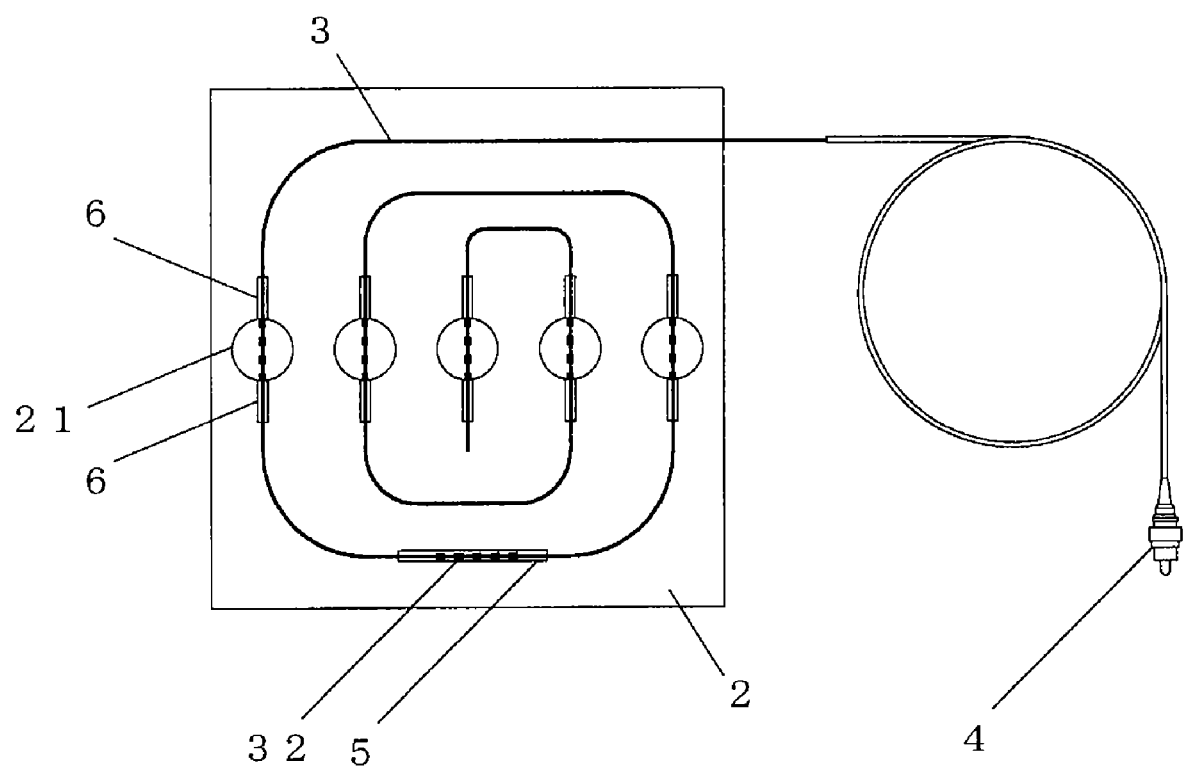
FIG. 9 is a plan view of the optical pressure sensor according to the first embodiment in a state where an arrangement of the optical fiber is different.

The arrangement of the optical fiber 3 is not particularly limited, and the optical fiber 3 may be arranged so as to form a spiral as shown in FIG. 9.

A flexible cover film 7', 7" for covering any of the plurality of through holes 21 may be arranged on the first surface 2a of the base film 2.

FIGS. 10(a) and 10(b) show plan views of optical pressure sensors 100E, 100E' including the cover films 7', 7" for covering any of the plurality of through holes 21 in place of the cover film 7 in the optical pressure sensor 100A.

In the optical pressure sensors 100E, 100E' shown in FIGS. 10(a) and 10(b), some of the plurality of through holes 21 are covered by the flexible cover films 7', 7". The cover films 7', 7" may be formed to cover each of the plurality of through holes 21 individually (see FIG. 10(a)) or may be formed to cover two or more through holes 21 (see FIG. 10(b)).

In the optical pressure sensor 100E shown in FIG. 10(a), only one through hole 21 at the middle out of the five through holes 21 is covered by the flexible cover film 7'.

In the optical pressure sensor 100E' shown in FIG. 10(b), on the other hand, the entire surface of the first surface 2a of the base film 2 excluding the region near the two through holes 21 is covered by the flexible cover film 7".

The sensitivity of one FBG portion 31 positioned in the through hole 21 that is covered by the flexible cover film 7', 7" becomes lower in comparison with the other FBG portion 31 positioned in the through hole 21 that is not covered by the cover film 7', 7", because the strain of the one FBG portion 31 follows the strain of the cover film 7', 7". That is, the arrangement of the flexible cover film 7', 7" makes it possible to locally lower the sensitivity of the FBG portion 31 at a desired area.

Therefore, even when detecting pressures at a plurality of measuring points in which the rates of pressure changes are extremely different one another, it is possible to simultaneously detect the pressures at the plurality of measuring points by using the plurality of FBG portion 31 having the same configurations one another.

For instance, it is possible to cover one FBG portion 31, which is positioned at one area (e.g., a front end portion of an automobile) where the measurement pressure is assumed to be large, by the flexible cover film 7', 7", and not to cover the other FBG portion 31, which is positioned at the other area (e.g., a side portion of the automobile) where the measurement pressure is assumed to be small, so that the one area on which the large pressure applies and the other area on which the small pressure applies could be simultaneously detected by the FBG portions 31 having the same configuration.

Furthermore, it is possible to change the shift amount of the FBG portion 31 by using the cover film 7', 7" of various thickness, thereby finely performing sensitivity adjustment.

Furthermore, it is also possible to cover only part of the FBG portion 31 with the cover film 7, 7', 7", so that the sensitivity of the corresponding FBG portion 31 is lowered.

The present embodiment has been described taking, as an example, the configuration in which the plurality of FBG portions 31 are fixed on the one base film 2 (and the one cover film 7 and the one adhesive film 8 are provided for the plurality of FBG portions 31), but the present invention is not limited thereto.

Figure 11:
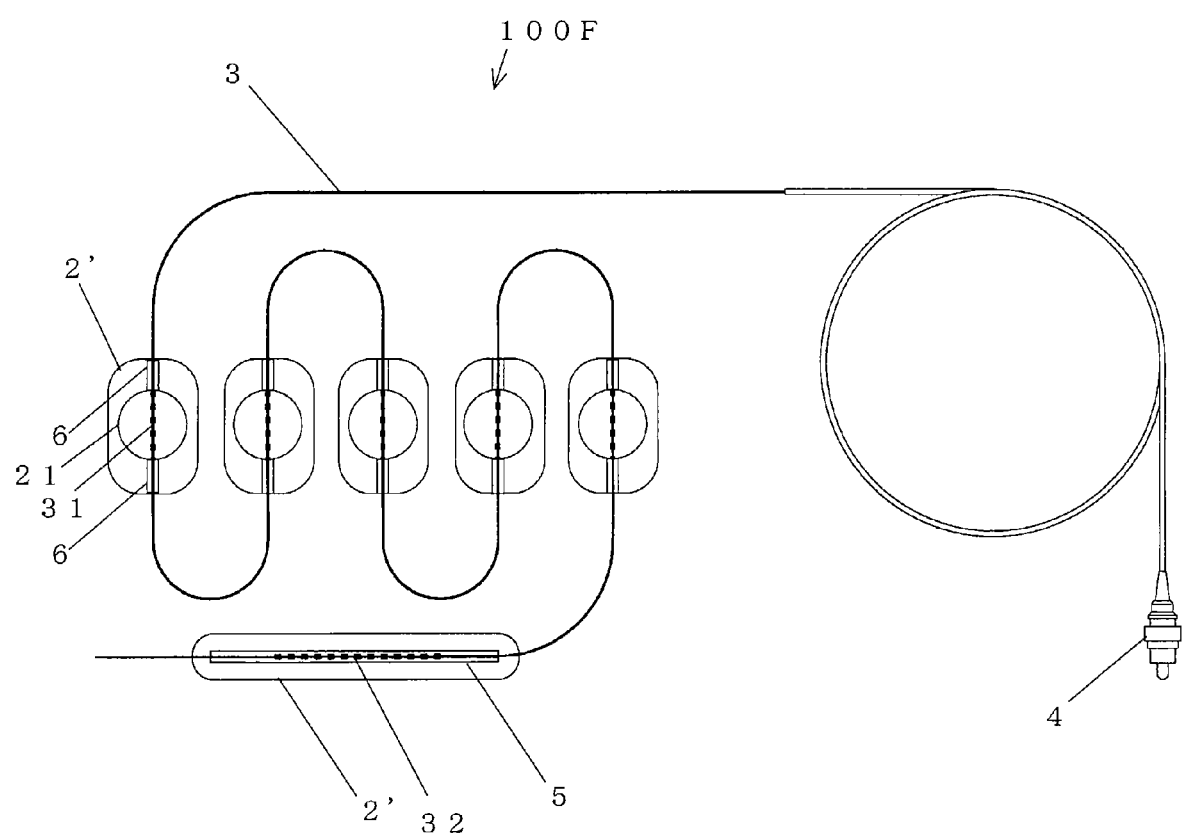
FIG. 11 is a plan view of an optical pressure sensor according to still another variation of the first embodiment.

FIG. 11 shows a plan view of an optical pressure sensor 100F having a configuration in which one base film 2' is arranged for one (may be plural) FBG portion 31 (in other words, a configuration in which the base film 2 is divided for every plural FBG portions 31).

The configuration could deal with various shapes of an object body to be measured, and easily have the sensor pitch (the space between the plurality of FBG portions 31) sparse or dense so that the degree of freedom of measurement mode can be heightened.

Second Embodiment

Another embodiment of an optical pressure sensor according to the present invention will now be described with reference to the accompanying drawings.

FIG. 12 is a schematic plan view of an optical pressure sensor 200A according to the present embodiment. FIG. 13(a) is a partially enlarged view of a region XIII(a) of FIG. 12, and FIGS. 13(b) and 13(c) are cross sectional views respectively taken along a line XIII(b)-XIII(b) and a line XIII(c)-XIII(c) of FIG. 13(a).

In the figures, the same members as those of the first embodiment have been given the same reference characters.

As shown in FIGS. 12 and 13, the optical pressure sensor 200A according to the present embodiment includes a base member 20 fixed to the object body, and the optical fiber 3 that has at least the one FBG portion 31 and that is fixed to the base member 20.

The FBG portion 31 has a diffraction grating configuration in which the refractive index of a core part of the optical fiber is periodically changed, and is configured to reflect only components having a predetermined wavelength (a Bragg wavelength) out of an incident light entering the optical fiber 3. The probe 4 is attached to the first end of the optical fiber 3, and the light source and the photodetector (both are not shown) are attached by way of the probe 4. Out of the incident light entering the optical fiber from the light source though the probe 4, a light having the wavelength is reflected by the FBG portion 31 and returned so that the photodetector detects the wavelength of the light.

Specifically, when the FBG portion 31 strains due to an external pressure change, the grating pitch of the diffraction grating of the FBG portion 31 expands and contracts according to the strain of the FBG portion 31 so that the Bragg wavelength to be reflected is shifted. Therefore, it is possible to detect a strain amount of the FBG portion 31, that is, an amount of the pressure applying on the FBG portion 31 by detecting the shift amount of the Bragg wavelength.

It is possible to attach another probe to the second end of the optical fiber 3 opposite the first end to which the probe 4 is attached, and to respectively attach the light source to the first end and the photodetector to the second end through the respective proves. In such a configuration, the photodetector detects the wavelength of the incident light that is not passed through the FBG portion 31 so that the pressure is detected.

In the present embodiment, the optical fiber 3 includes a plurality of (five in the illustrated embodiment) of FBG portions 31 arranged along a longitudinal direction of the optical fiber 3, the plurality of FBG portion 31 having different reflection characteristics one another.

The base member 20 is configured to include a sealed space having a surface, on which the external pressure to be measured applies, covered by a flexible first cover film 70.

Specifically, the base member 20 includes the flexible base film 2, a flexible first cover film 70 and a flexible second cover film 80.

The base film 2 includes the first surface 2a to which the optical fiber 3 is fixed; the second surface 2b closely attached to the surface of the object body directly or indirectly; the through holes 21 passing through the first and second surfaces 2a, 2b, the through holes 21 being as many as the FBG portion 31; and a slit 24 fluidly connecting the plurality of through holes 21 one another.

The first cover film 70 is fixedly attached to the first surface 2a of the base film 2 so as to cover first ends on one sides of the through holes 21 and the slit 21.

The second cover film 80 is fixedly attached to the second surface 2b of the base film 2 so as to cover second ends on the other sides of the through holes 21 and the slit 21 for forming the sealed space in cooperation with the first cover film 70.

The base film 2 is further provided with an external communicating slit 23 having a first end fluidly connected to the sealed space that is defined by the plurality of through holes 21 and a slit 24 and a second end opened to the outside.

The slit 23 is connected to an introducing pipe 231 for introducing air into the sealed space.

The optical pressure sensor 200A is configured to detect the change of reflection characteristics (the shift amount of Bragg wavelength by distortion of the FBG portion 31) of the FBG portion 31 of the optical fiber 3 contacting the inner surface of the first cover film 70 in a state where the sealed space is maintained at a reference pressure through the slit 23 opened to the outside.

It is possible to detect the pressure change (the differential pressure) from the reference pressure by the configuration where one surface of the sealed space maintained at the predetermined reference pressure is covered with the first cover film 70 having flexibility, and the change of the pressure acting on the first cover film 70 is detected using the change in reflection characteristics of the FBG portion 31 of the optical fiber 3 contacting the inner surface of the first cover film 70.

The optical fiber 3 is arranged such that the plurality of FBG portions 31 are respectively positioned on the corresponding through holes 21 in plan view.

It is obviously possible that the optical fiber 3 includes only one FBG portion 31, or more or less than five FBG portions 31.

In a case where the plurality of FBG portions 31 are arranged in the optical fiber 3 as in the present embodiment, the plurality of FBG portions 31 are configured so as to have different reflection characteristics (Bragg wavelengths) from one another.

For example, one FBG portion 31 may be set to have the Bragg wavelength of 1520 nm in a state (an initial state) where no pressure change occurs, and the remaining FBG portions 31 may be set to have the Bragg wavelengths (1521 nm, 1522 nm, . . . ) that are sequentially increased by 1 nm from one another in the initial state. In this case, the incident light from the light source is set to have a wavelength including all the Bragg wavelengths of the plurality of FBG portions 31. That is, it is configured that the light having the wavelength of 1520 nm to 1570 nm enters the optical fiber 3 from the light source.

The measurement of the shift amounts of the Bragg wavelengths of the respective plural FBG portions 31 with the configuration makes it possible to easily detect the pressures at a plurality of (a large number of) points without using tubes needed in the conventional piezoelectric or semiconductor pressure sensor, thereby detecting more specific pressure changes at a plurality of points over a wide area.

Figure 14:
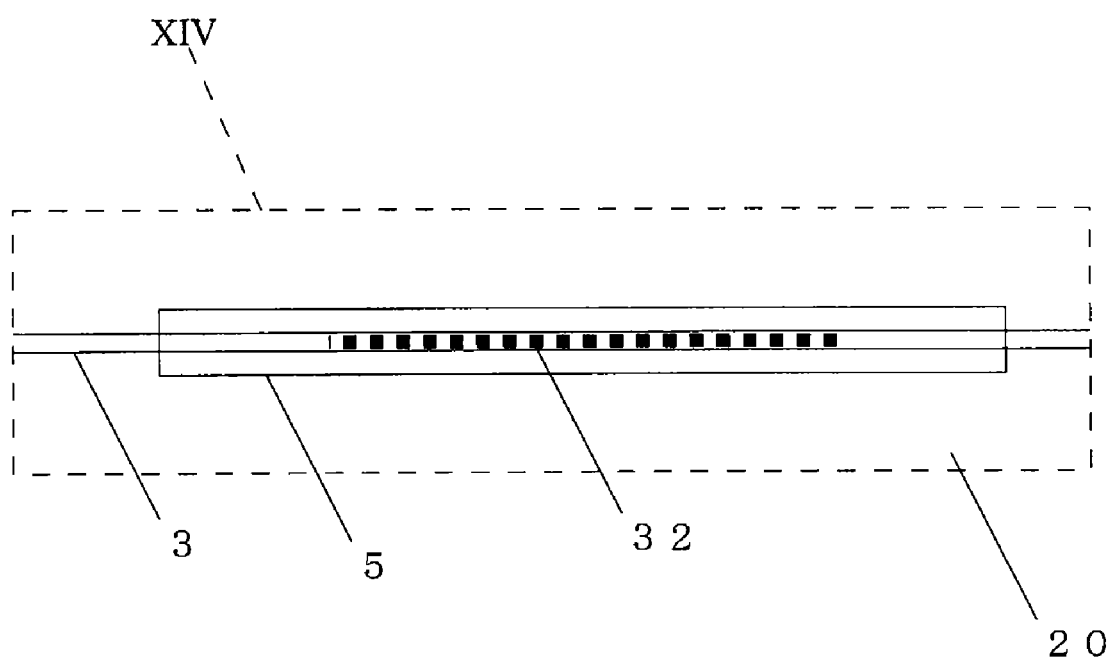
FIG. 14 is a partially enlarged view of a region XIV in FIG. 12.

In the present embodiment, the optical fiber 3 is provided with the temperature compensating FBG portion 32, as shown in FIG. 12. FIG. 14 shows a partially enlarged view of a region XIV in FIG. 12.

The temperature compensating FBG portion 32 is inserted into the rigid hollow member 5 fixed to the base film 2. In the present embodiment, the optical fiber 3 is fixed to the first surface 2a of the base film 2. Therefore, the hollow member 5 is also fixed to the first surface 2a of the base film 2.

The hollow member 5 has such rigidity that prevents the hollow member 5 from being deformed by the external pressure and has such an inner diameter that allows the optical fiber 3 to slidably move within the hollow member 5. The hollow member 5 may be an aluminum pipe.

It is possible to distinguish a error component which is caused by an external temperature change from the measurement value of the FBG portion 31 by arranging the FBG portion 32 in the rigid hollow member 5 in a slidably movable manner as described above, thereby detecting an accurate pressure value.

In other words, the FBG portion 31 strains in response to both a pressure change and a temperature change so that the Bragg wavelength is shifted. On the other hand, the temperature compensating FBG portion 32 strains in response to only the temperature change without being subjected to the pressure change since it is arranged within the hollow member 5.

Therefore, it is possible to detect a net pressure change (irrespective of the temperature change) by offsetting the measurement result of the temperature compensating FBG portion 32 from the measurement result of the pressure measurement FBG portion 31.

As shown in FIG. 12, only one temperature compensating FBG portion 32 is arranged on the one base film 2 in the present embodiment, but obviously, a plurality of the FBG portions 32 may be arranged. The installing position of the temperature compensating FBG portion 32 is not particularly limited, but the FBG portion 32 is preferably arranged close to the FBG portion 31 to an extent such that the FBG portion 32 is subjected to the same temperature condition as the pressure measurement FBG portion 31.

Figure 15:
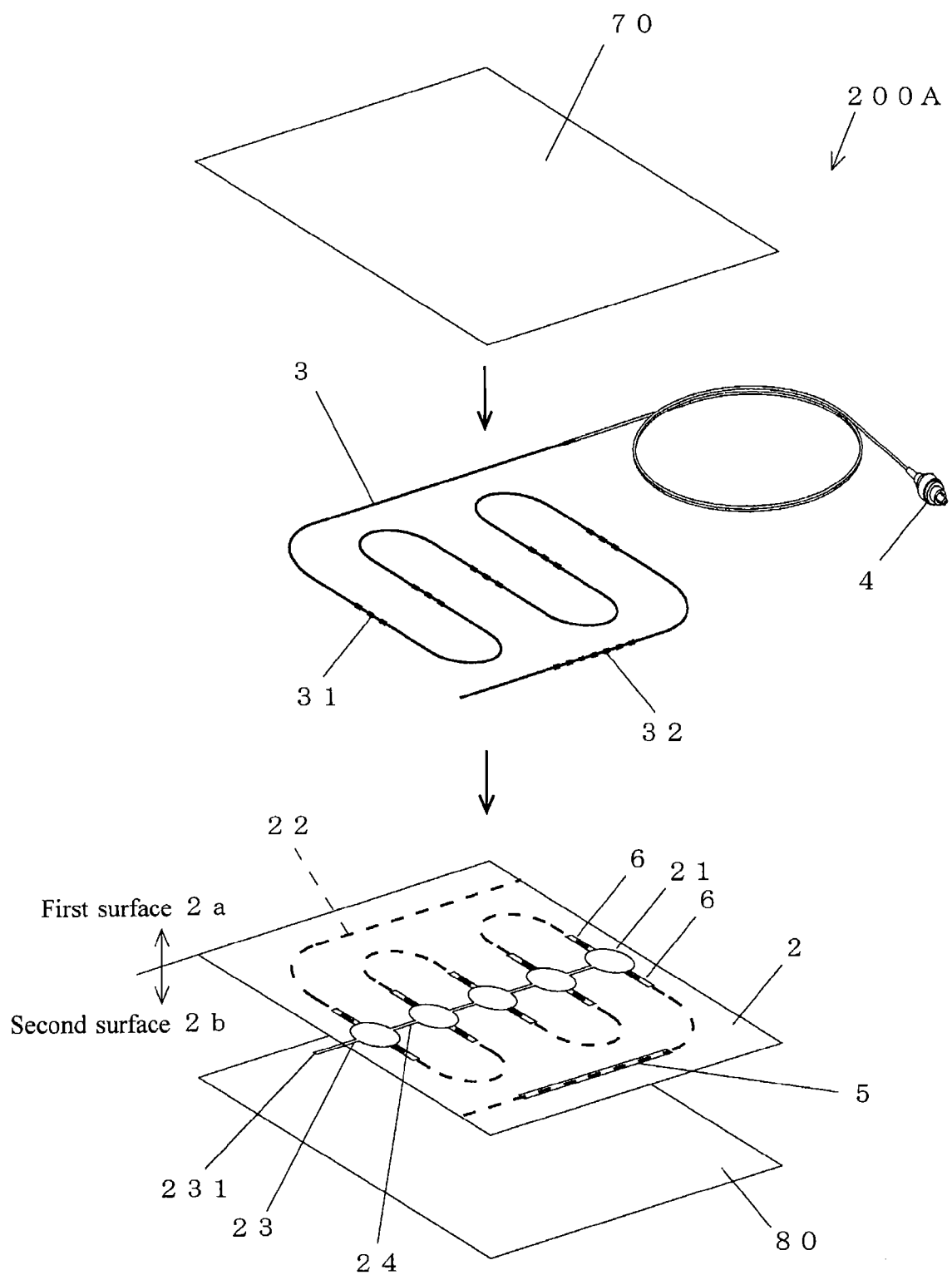
FIG. 15 is an exploded perspective view of the optical pressure sensor according to the second embodiment.

FIG. 15 shows an exploded perspective view of the optical pressure sensor 200A.

The base film 2 may be a flexible film having a film thickness of about 30 μm to 500 μm, for example. Examples of such flexible films include polyester films and flexible impact absorbing materials.

According to such a configuration, the optical pressure sensor 200A can be closely attached to the object body even when the surface of the object body is not planar, and thus the pressure measurement can be carried out with high accuracy.

Furthermore, in a case where the impact absorbing material is used as the base film 2, the base film 2 can absorb the impact from the outside, thereby preventing the optical fiber 3 from being damaged due to the impact. Moreover, the configuration could alleviate stress concentration on the optical fiber 3 even when the base film 2 is attached to the object body with being forcibly deformed.

In the optical pressure sensor 200A according to the present embodiment, it is possible to thicken the base film 2 to such an extent (e.g., about 0.5 to 1.0 mm) that the attachment of the base film 2 to the object body is not affected, since the measurement value of the FBG portion 31 is not directly influenced by the thickness and the hardness of the base film 2, thereby enhancing the durability of the optical pressure sensor 200A.

The base film 2 is formed with the through holes 21 passing through the first surface 2a and the second surface 2b. The shape of the through hole 21 is not particularly limited to, but is preferably a shape having a diameter substantially the same as or slightly larger than the axial length of the FBG portion 31 of the optical fiber 3 to be attached.

The optical fiber 3 is fixed to the base film 2 (at the first surface 2a in the present embodiment) at a region other than the FBG portion 31 so that the FBG portion 31 is positioned on the corresponding through hole 21 in plan view (FIG. 12).

In the present embodiment, the optical fiber 3 is firmly fixed to the first surface 2a of the base film 2 at both sides of the FBG portion 31 by the fixing films 6.

The fixing film 6 may be a double-faced tape interposed between the first surface 2a and the optical fiber 3 to firmly fix the first surface 2a and the optical fiber 3, or may be an adhesive tape attached from above after arranging the optical fiber 3 on the first surface 2a.

In place of using the fixing film 6, the optical fiber 3 may be fixed to the base film 2 with an adhesive.

The temperature compensating FBG portion 32 is also fixed to the base film 2 by using the same configuration as that for the FBG portion 31.

Specifically, as shown in FIGS. 12 and 13, the optical fiber 3 is fixed to the base film 2 at both sides of the through hole 21, on which the FBG portion 31 is positioned, in the longitudinal direction of the optical fiber 3.

The positional shift of the FBG portion 31 with respect to the through hole 21 can be effectively prevented by fixing the optical fiber 3 to the base film 2 at both sides of the FBG portion 31.

The portion of the optical fiber 3 other than the both sides of the FBG portion 31 does not necessarily have to be fixed.

In the configuration in which the plurality of FBG portions 31 are respectively positioned on the corresponding through holes 21 as in the present embodiment, it is possible to arrange a region of the optical fiber 3 between the adjacent FBG portions 31 in a curve shape so as to be positioned in the same plane as the adjacent FBG portions 31, and to arrange a region of the optical fiber 3 positioned on an outer side in the longitudinal direction than one FBG portion 31, which is positioned at an end in the longitudinal direction of the optical fiber 3, on a region of the base film 2 different from the through hole 21 so as to be positioned in the same plane as the one FBG portion 31, as shown with a broken line 22 in FIG. 15. With the configuration, it is possible to prevent the bumps due to the optical fiber 3 from increasing on the measuring surface.

It is of course possible to firmly fix the portion of the optical fiber 3 other than the both sides of the FBG portion 31 to the base film 2 with an adhesive or the like.

A groove in which the optical fiber 3 is at least partially positioned may be arranged along the broken line 22 of FIG. 15 so that the bumps on the measuring surface due to the outer diameter of the optical fiber 3 are reduced as much as possible to enhance the measurement accuracy.

That is, it is possible to form the groove on the first surface 2a of the base film 2 and to arrange the portion of the optical fiber 3 other than the portion positioned on the through hole 21 in plan view within the groove, as in FIG. 23 in the first embodiment.

The first cover film 70 is attached so as to cover the first surface 2a of the base film 2 in a state where the optical fiber 3 is arranged on the base film 2.

The optical fiber 3 is interposed between the first surface 2a of the base film 2 and the first cover film 70 in a state where the FBG portion 31 is positioned on the through hole 21 in plan view.

The arrangement of the first cover film 70 makes it possible to smoothen the measuring surface, thereby reducing the measurement error to enhance measurement accuracy.

The first cover film 70 is preferably made of a flexible film such as a polyester film.

In the present embodiment, although the bending of FBG portion 31 follows the bending of the first cover film 70 by the external pressure, the sensitivity of the FBG portion 31 is satisfactorily maintained since the FBG portion 31 is positioned on the through hole 21 and the flexible film is used as the first cover film 70.

That is, there is a space, which is formed by the through holes 21, between the portion of the first cover film 70 contacting the FBG portion 31 and the object body. Therefore, the sensitivity of the FBG portion 31 can be enhanced so that a more minute pressure change can be effectively detected in comparison with the conventional configuration where the pressure is detected based on the deformation of the FBG portion involved in the deformation of the base film itself.

The first cover film 70 preferably has a thickness (e.g., 0.05 mm) less than that of the base film 2, thereby preventing the measurement sensitivity from lowering as much as possible.

In the present embodiment, the FBG portion 31 is firmly fixed to the inner surface of the first cover film 70 so as to follow the bending of the first cover film 70 involved in the external pressure change with respect to the reference pressure.

Specifically, the FBG portion 31 is fixed to the inner surface of the first cover film 70 with an adhesive or the like, so that the bending of the FBG portion 31 follows the bending of the first cover film 70 that is occurred in response to the external pressure change with respect to the reference pressure.

The configuration makes it possible to more accurately detect a more minute pressure change.

The configuration also makes it possible to more accurately detect the pressure change, even when the external pressure is lower than the reference pressure (i.e. the external pressure is a negative pressure), that is, even when the first cover film 70 bends outward.

In a case where the cover film 70 for covering the entire surface of the base film 2 is provided as in the present embodiment, it may be possible to form a groove in which the optical fiber 3 could be at least partially arranged in the first cover film 70.

Specifically, the first cover film 70 may be formed with a groove at a region of the inner surface (a surface facing the base film 2) of the first cover film 70 corresponding to the optical fiber 3 so that the optical fiber 3 could be arranged within the groove, as in the configuration shown in FIG. 24(a) of the first embodiment.

In the present embodiment, the second cover film 80 is firmly fixed to the second surface 2b of the base film 2.

That is, the sealed space is formed by the through holes 21 and the slits 24 formed in the base film 2, the first cover film 70, and the second cover film 80.

The second cover film 80 is fixed to the second surface 2b of the base film 2 on a side close to the object body by, for example, an adhesive.

The second cover film 80 may preferably have an adhesive layer capable of adhering to the object body, on an opposite surface of the second cover film 80 as the base film 2.

The arrangement of the adhesive layer in the second cover film 80 makes it possible to directly adhere the optical pressure sensor 200A to the surface of the object body to be measured. Therefore, the optical pressure sensor 200A can be easily attached without damaging the object body (without processing the object body).

The adhesive layer of the second cover film 80 is preferably configured to be strippable with respect to the object body (have low viscosity). Thus, the optical pressure sensor 200A can be easily detached from the object body without damaging the object body after the measurement, and both the object body and the optical pressure sensor 200A can be reused.

The second cover film 80 is also preferably a flexible film (e.g., a polyester film) so that following property of the optical pressure sensor 200A with respect to the object body is not affected due to the second cover film 80.

An optical pressure sensor 200B according to a variation of the present embodiment will now be described.

Figure 16:
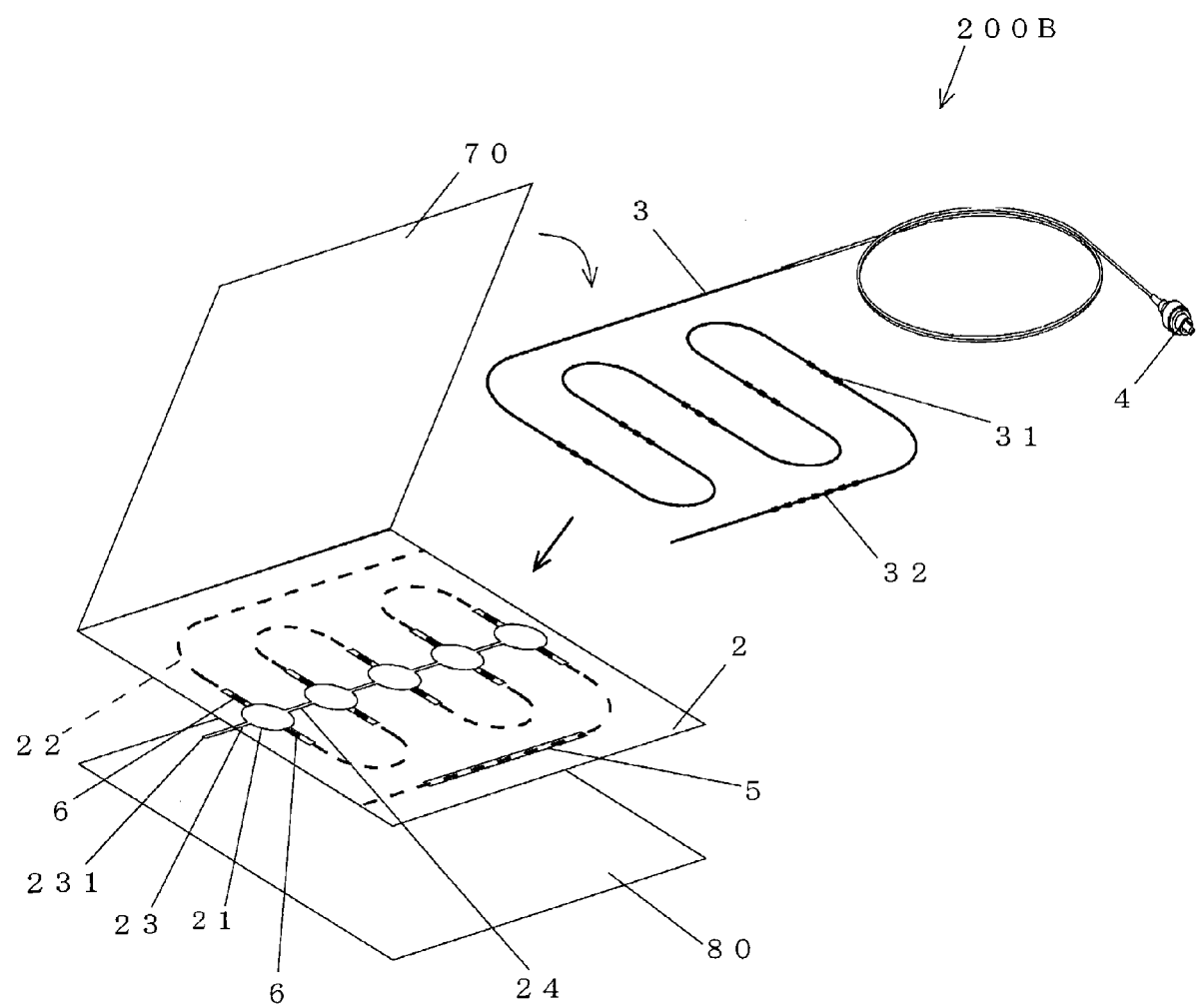
FIG. 16 is an exploded perspective view of an optical pressure sensor according to a variation of the second embodiment.

FIG. 16 shows an exploded perspective view of the optical pressure sensor 200B.

As shown in FIG. 16, in the optical pressure sensor 200B, the first cover film 70 and the base film 2 are integrally formed to each other.

That is, the optical pressure sensor 200B includes a single film forming the first cover film 70 and the base film 2. The single film is folded with the optical fiber 3 including the FBG portions 31, 32 sandwiched between one part forming the cover film 7 and the other part forming the base film 2.

Alternatively, it is possible to integrally form the first cover film 70 and the second cover film 80, or to integrally form the second cover film 80 and the base film 2.

As described above, in the optical pressure sensors 200A, 200B, the base member 20 has the sealed space covered by the first cover film 70 having flexibility and the second cover film 80, and the FBG portion 31 of the optical fiber 3 is fixed to the base member 20 while contacting the inner surface of the first cover film 70 facing the sealed space. The optical pressure sensors 200A, 200B are configured to detect the change of reflection characteristics of the FBG portion 31 (the shift of Bragg wavelength due to strain of the FBG portion 31) of the optical fiber 3 contacting the inner surface of the first cover film 70 in a state where the sealed space is maintained at the reference pressure (set at the predetermined reference pressure).

According to the thus configured optical pressure sensors 200A, 200B, it is possible to detect the external pressure change as the differential pressure with respect to the reference pressure.

That is, the optical sensors 200A, 200B could effectively detect not only the pressure (a positive pressure) at which the capacity of the sealed space decreases but also the pressure (a negative pressure) at which the capacity of the sealed space increases.

Furthermore, since the FBG portion 31 is positioned in the through hole 21 in plan view (arranged at the area not contacting the base film 2), the strain of the FBG portion 31 following the bending of the first cover film 70 will neither be hindered nor attenuated by the base film 2. Thus, it is possible to detect a more minute pressure change in comparison with the conventional optical pressure sensor in which the pressure is detected based on the bending of the base film 2.

However the FBG portion 31 of the optical fiber 3 is fixed to the inner surface of the first cover film 70 in the present embodiment, it is also possible to fix the optical fiber 3 to the outer surface of the first cover film 70 with the FBG portion 31 positioned on the through hole 21 in plan view.

Figure 17:
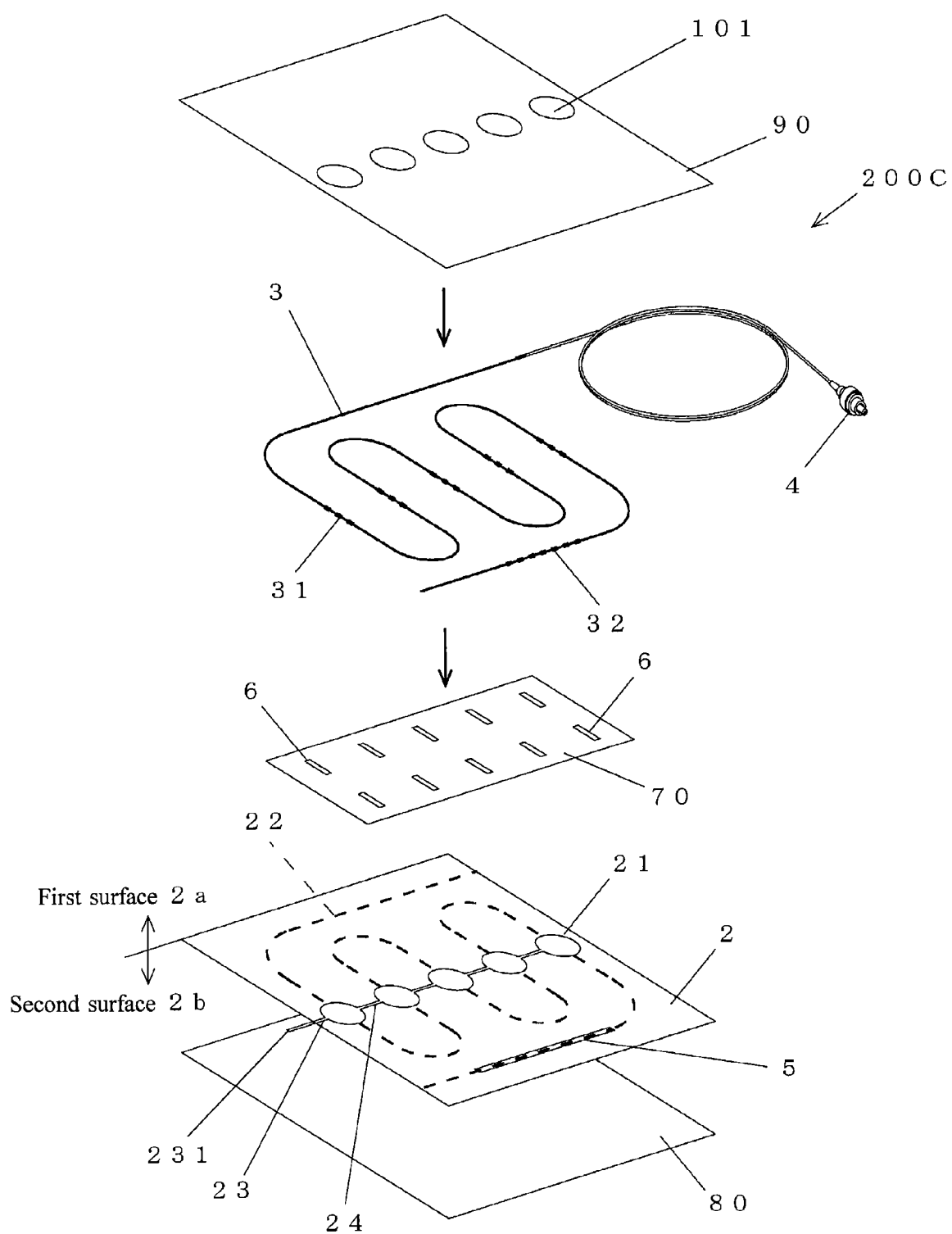
FIG. 17 is an exploded perspective view of an optical pressure sensor according to another variation of the second embodiment.

FIG. 17 shows an exploded perspective view of an optical pressure sensor 200C according to a variation of the present embodiment, the optical pressure sensor 200B being configured so that the optical fiber 3 is fixed to the outer surface of the first cover film 70.

In the optical pressure sensor 200C, the optical fiber 3 is fixed to the outer surface of the first cover film 70 in a state where the FBG portion 31 is positioned on the through hole 21 in plan view.

Specifically, the optical fiber 3 is firmly fixed to the outer surface of the first cover film 70 at both sides of the FBG portion 31 by fixing films 6.

The optical pressure sensor 200C is configured to detect the change of reflection characteristics of the FBG portion 31 (the shift of Bragg wavelength due to strain of the FBG portion 31) in a state where the sealed space is maintained at the reference pressure, similar to the optical pressure sensors 200A, 200B.

The optical pressure sensor 200C further includes a third cover film 90 (a flexible film similar to the first cover film 70) having substantially the same size as the base film 2, the third cover film 90 being attached to the outer surface of the first cover film 70 with the optical fiber 3 arranged on the outer surface of the first cover film 70, thereby more effectively preventing the positional shift of the optical fiber 3 (a portion of the optical fiber 3 other than FBG portion 31).

The first cover film 70 need not be the same size (may be smaller) as the base film 2 as long as it has a size necessary for forming the sealed space (i.e. a size enough to cover all the through holes 21 and the slits 24).

The third cover film 70 is preferably formed with openings (apertures 101) at portions corresponding to the through holes 21, thereby enhancing the measurement sensitivity of the FBG portions 31.

In a case where the optical fiber 3 is arranged on the outer surface of the first cover film 70 as shown in FIG. 17, the first cover film 70 may be formed with a groove, in which the optical fiber 3 could be arranged, on the outer surface, as in the configuration shown in FIG. 24(b) in the first embodiment, thereby preventing or reducing the bumps on the measuring surface.

In the present embodiment, the optical fiber 3 preferably is fixed to the base film 2 or the first cover film 70 at both sides of the FBG portion with the FBG portion 31 bent in an axial direction of the through hole 21, so as to create a state in which the Bragg wavelength is shifted by a predetermined wavelength in the initial state.

In a case where the FBG portion 31 is fixed so as to be linear in the initial state, the shift direction of the Bragg wavelength when the pressure to be detected is a positive pressure (the positive pressure mean the pressure causing the FBG portion 31 to strain in a positive direction which is a direction from the measuring surface towards the inner side of the sealed space) is same as the shift direction of the Bragg wavelength when the pressure to be detected is a negative pressure. That is, the FBG portion 31 shifts in the same direction by the same amount irrespective of the strain direction of the FBG portion 31 if the shift amount of the FBG portion when a given positive pressure applies and that when a given negative pressure applies are same, resulting in impossibility (or difficulty) in detecting whether the pressure is a positive pressure or a negative pressure.

On the other hand, the pre-shift of the Bragg wavelength in any one of pressure applying directions in the initial state could have a shift direction of the Bragg wavelength shifts when a positive pressure is applied different from a shift direction of the Bragg wavelength shifts when a negative pressure is applied.

More specific description will be made hereinafter.

FIG. 18 shows a cross sectional view of a configuration where both sides of the FBG portion 31 are fixed with the FBG portion 31 pre-bent in one of the pressure applying directions in the optical pressure sensor shown in FIG. 17.

FIG. 18(a) shows the initial state when an external pressure is not applied, FIG. 18(b) shows a state where a positive external pressure is applied, and FIG. 18(c) shows a state where a negative external pressure is applied.

In the configuration shown in FIG. 18, the FBG portion 31 is bent so that the Bragg wavelength $\lambda_B$ in the initial state (hereinafter referred to as initial Bragg wavelength) is pre-shifted in the positive direction, as shown in FIG. 18(a), with respect to the Bragg wavelength in a state where the FBG portion is linear.

Specifically, in the configuration shown in FIG. 18, a spacer 71 is arranged on the outer surface of the first cover film 70 so as to be interposed between the outer surface of the first cover film 70 and the FBG portion 31, so that the FBG portion 31 is pre-bent in one of the axial directions of the through hole 21 (i.e., one of the pressure applying directions) by the spacer 71.

In the configuration shown in FIG. 18, the spacer 71 is arranged substantially at a center in the axial direction of the FBG portion 31, so that the region of the FBG portion 31 substantially at the center in the axial direction is most away from the first cover film 70.

That is, when no external pressure is applied (i.e., when the external pressure is substantially equal to the reference pressure in the sealed space), the region of the FBG portion 31 substantially at the center in the axial direction is bent so as to be convex upward.

When a positive external pressure applies on the FBG portion 31 in the initial state as shown in FIG. 18(a) (when an external pressure applies in a direction towards the inner side of the sealed space from the measuring surface, that is, when the external pressure higher that the reference pressure), the FBG portion 31 bends in such a direction that the bending amount becomes smaller so that the Bragg wavelength shifts in a direction opposite the direction in which the initial Bragg wavelength $\lambda_B$ is shifted with the Bragg wavelength in the case where the FBG portion 31 is substantially linear as a reference (see FIG. 18(b)). This means that the Bragg wavelength shifts in the negative direction when the positive external pressure applies, assuming that the initial Bragg wavelength $\lambda_B$ is 0.

On the other hand, when a negative external pressure applies on the FBG portion 31 in the initial state as shown in FIG. 18(a) (when the external pressure is lower than the pressure in the sealed space, that is, when the external pressure is lower than the reference pressure), the FBG portion 31 bends in such a direction that the bending amount becomes larger so that the Bragg wavelength shifts in the same direction as the direction in which the initial Bragg wavelength $\lambda_B$ is shifted (see FIG. 18(c)). This means that the Bragg wavelength shifts in the positive direction when the negative pressure applies, assuming that the initial Bragg wavelength $\lambda_B$ is 0.

Therefore, it is possible to definitely detect whether the pressure applying on the FBG portion 31 is a positive pressure or a negative pressure thus can be more definitely determined by fixing both sides of the FBG portion 31 to the base film 2 or the first cover film 70 with the FBG portion 31 bent to a certain extent in any one of opposite sides in the axial direction of the through hole 21 in the initial state so that the Bragg wavelength $\lambda_B$ in the initial state is pre-shifted with respect to the Bragg wavelength in the state where the FBG portion 31 is substantially linear.

When the external pressure applies in such a direction that the bending amount of the FBG portion 31 becomes smaller from the initial state (when the external positive pressure applies on the configuration shown in FIG. 18), the shift amount of the Bragg wavelength with respect to the initial Bragg wavelength $\lambda_B$ becomes larger as the pressure increases until the FBG portion 31 becomes linear without bending, and thereafter, when the pressure further increases and the FBG portion 31 starts to bend towards the side opposite the bent direction in the initial state, the shift amount of the Bragg wavelength with respect to the initial Bragg wavelength $\lambda_B$ becomes smaller as the pressure increases, and the shift amount of the Bragg wavelength with respect to the initial Bragg wavelength $\lambda_B$ becomes zero at the point where the FBG portion 31 is bent in the opposite direction by the same amount as the bending amount in the initial state.

In other words, when the pressure is applied in such a direction that the bending amount becomes smaller from the initial state, the shift direction of the Bragg wavelength with respect to the initial Bragg wavelength $\lambda_B$ switches with the state in which the FBG portion 31 becomes substantially linear as a reference.

Therefore, it is preferable that the FBG portion 31 is bent so as to be convex upward (so as to have a convex shape in a direction away from the sealed space) in the initial state (see FIG. 18) when it is assumed that the negative pressure is likely to occur and the FBG portion 31 is bent so as to be convex downward (so as to have a convex shape in a direction approaching the sealed space) in the initial state (not shown) when it is assumed that a positive pressure is likely to occur, based on the measurement position and the type (water pressure, air pressure, and the like) of the external pressure.

Such a preferred configuration makes it possible to prevent the shift direction of the Bragg wavelength with respect to the initial Bragg wavelength $\lambda_B$ from being switched with the state in which the FBG portion 31 becomes substantially linear as a reference.

It is possible to detect pressure over a wide area by connecting a plurality of the optical pressure sensors 200A-200C, for example in series.

FIG. 19 shows a usage example where a plurality of the optical pressure sensors 200A-200C are connected in series.

In the usage example shown in FIG. 19, each of the optical pressure sensors 200A-200C include the probe 4 and a probe 4' connectable to the probe 4 respectively arranged at first and second ends of the optical fiber 3.

The probe 4' in one optical pressure sensor 200A-200C is connected to the probe 4 in another optical pressure sensor 200A-200C, so that all of the FBG portions 31 of the plurality of optical pressure sensors 200A-200C are connected in series.

The pressures of a large number of measuring points can be simultaneously measured with one channel by connecting the plurality of unitized optical pressure sensors 200A-200C as described above.

Please note that the measurement can be performed without deteriorating measurement accuracy even if such a connection is made, since the incident light is less attenuated in the optical fiber 3.

The configuration in which the FBG portion 31 is positioned on the through hole 21 in plan view includes a configuration in which a portion of the FBG portion 31 is positioned on the through hole 21, as shown in FIG. 25, in addition to the configuration in which the entire region of the FBG portion 31 is positioned on the through hole 21, as shown in FIGS. 12, 13 and 18.

Positioning only a portion of the FBG portion 31 on the through hole 21, as shown in FIG. 25, can lower the sensitivity of the FBG portion 31.

That is, the sensitivity of the FBG portion 31 can be adjusted by adjusting the length of the portion of the FBG portion 31 positioned on the through hole 21.

Therefore, the measurable pressure range can be substantially widened by appropriately changing the length of the portion of the FBG portion positioned on the through hole 21 in accordance with the magnitude of the expected pressure at the measurement point.

Furthermore, the above configuration has an effect of reducing the generation of extra noise due to overreaction of the FBG portion 31.

The present embodiment has been described taking, as an example, the configuration in which the optical pressure sensor 200A-200C has flexibility as a whole, but the present invention is not limited thereto.

Figure 20:
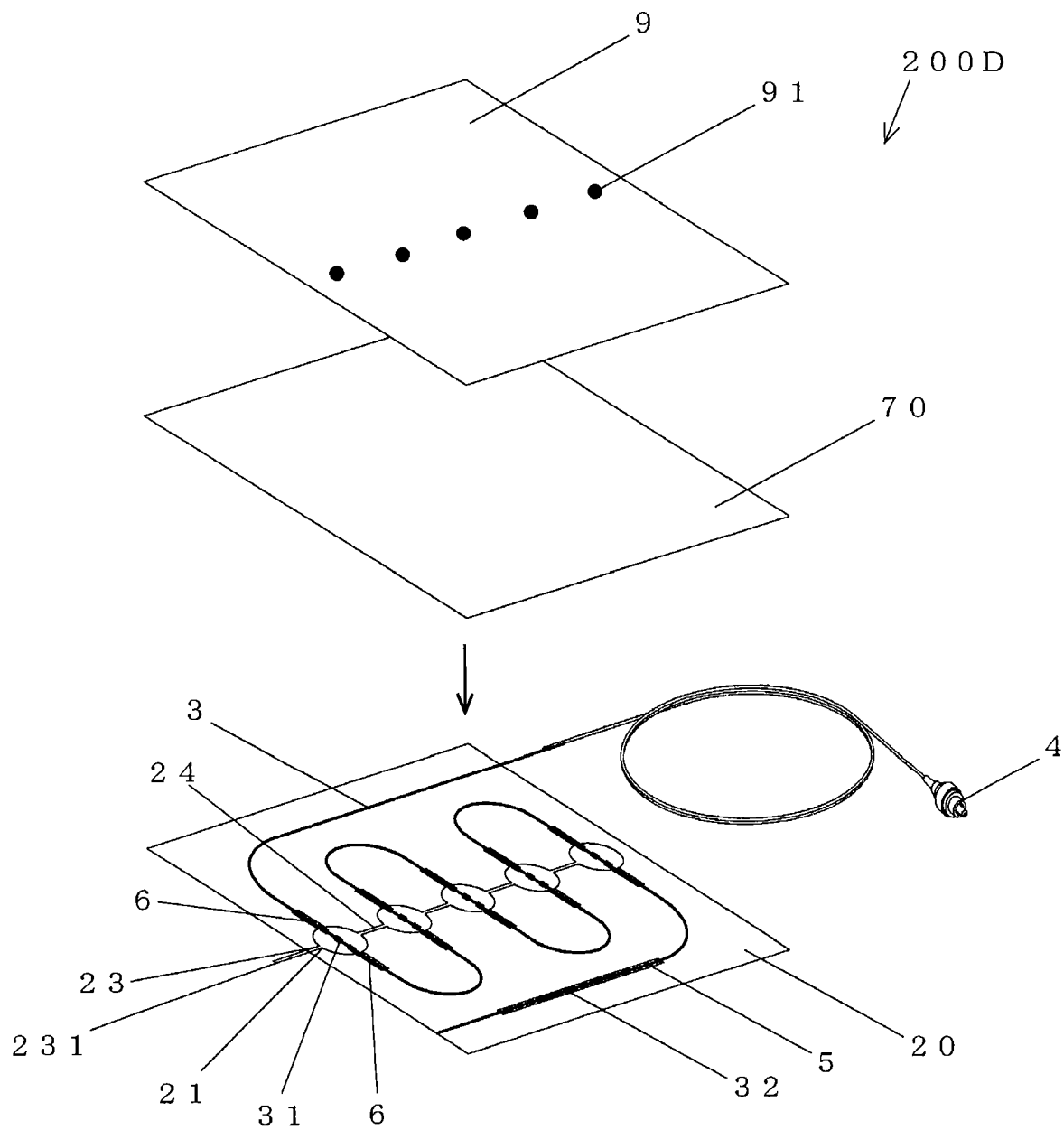
FIG. 20 is an exploded perspective view of an optical pressure sensor according to still another variation of the second embodiment.

FIG. 20 shows an exploded perspective view of an optical pressure sensor 200C according to still another variation of the present embodiment.

As shown in FIG. 20, the optical pressure sensor 200C further includes the rigid cover plate 9 arranged on the measuring surface of the first cover film 70 on which the external pressure is applied.

The cover plate 9 is formed with passing holes 91 at positions corresponding to the FBG portions 31.

The passing hole 91 may have a diameter substantially the same as or smaller than that of the through hole 21 of the base film 2.

The rigid cover plate 9 eliminates the bumps on the surface due to the diameter of the optical fiber 3 and the like, thereby smoothening the measuring surface. Accordingly, it is possible to detect a minute pressure change without depending on the surface profile of the base member 20.

In a case where pressures at a plurality of points on the smooth plane are respectively detected by the plurality of FBG portions 31, the arrangement of the rigid cover plate 9 makes it possible to reliably hold the plurality of FBG portions 31 at the respective installing positions.

Although the through holes 21 of the same number as the FBG portions 31 are formed in the present embodiment, the present invention is not limited to such configuration.

Figure 21:
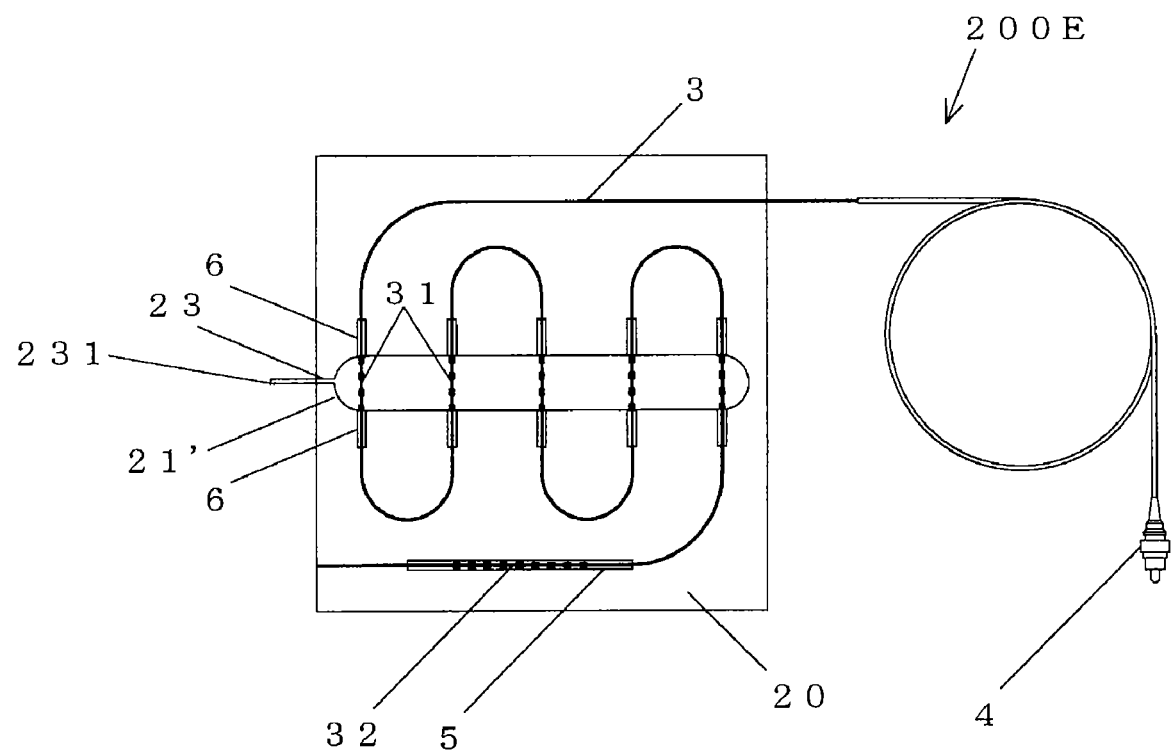
FIG. 21 is a plan view of an optical pressure sensor according to still another variation of the second embodiment.

FIG. 21 shows a plan view of an optical pressure sensor 200E according to still another variation of the present embodiment.

As shown in FIG. 21, the optical pressure sensor 200E is configured so that the base member 20 is formed with a single through hole 21', and the optical fiber 3 is arranged such that the plurality of FBG portions 31 are positioned on the single through hole 21' in plan view.

The base member 20 is further formed with the external communicating slit 23 having a first end fluidly connected to the single through hole 21' and a second end opened to the outside.

Alternatively, it is possible to form a through hole corresponding to some of the plurality of FBG portions 31.

Figure 22:
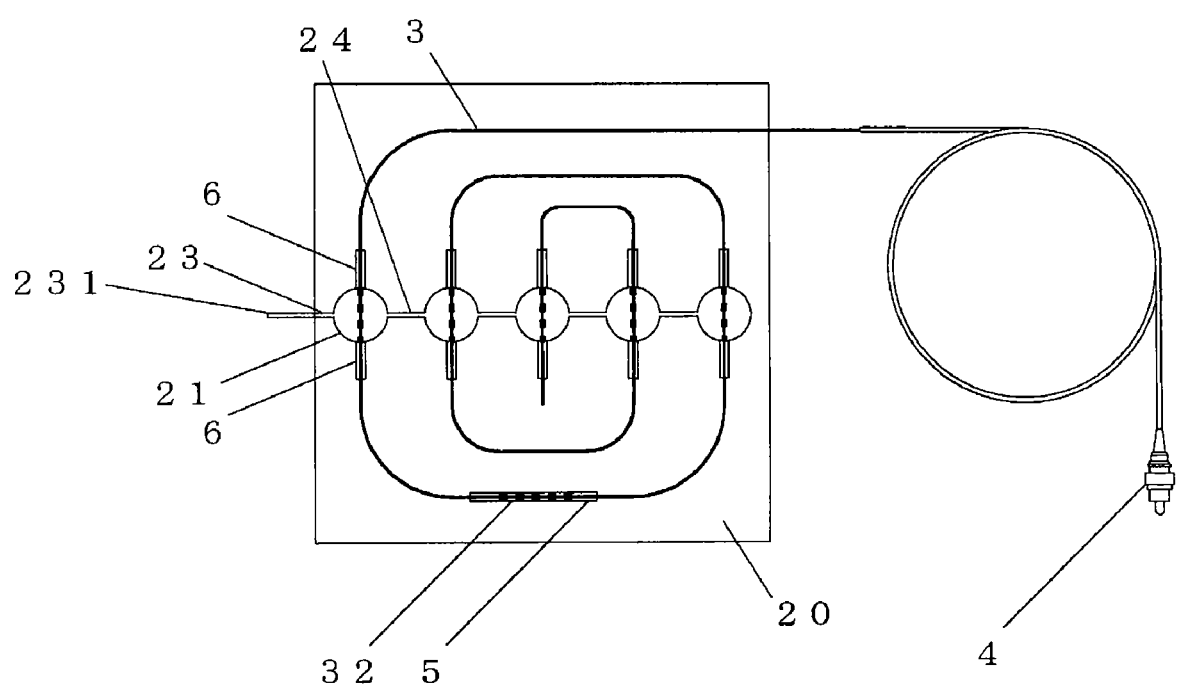
FIG. 22 is a plan view of the optical pressure sensor according to the second embodiment in a state where an arrangement of the optical fiber is different.

The arrangement of the optical fiber 3 is not particularly limited, and the optical fiber 3 may be arranged so as to form a spiral as shown in FIG. 22.

In each of the embodiments, it is possible to arrange a hollow reinforcing ring 210 within the through hole 21 in the base film 2, the reinforcing ring 210 being made of a material having rigidity higher than that of base film 2, and position at lease a part of the FBG portion 31 on the hollow portion of the reinforcing member 210 in plan view.

The arrangement of the reinforcing member 210 makes it possible to more enhance stability of the FBG portion 31 and the cover film 2.

FIG. 26(a) shows an example of a configuration where the reinforcing member 210 is provided.

FIG. 26(b) shows a cross sectional view taking along a line XXVI(b)-XXVI(b) in FIG. 26(a).

The reinforcing member 210 is preferably configured so that its outer circumferential surface contacts the inner circumferential surface of the through hole 21.

The reinforcing member may be made of a metal or a resign having higher rigidity than the base film.

The invention claimed is:

1. An optical pressure sensor comprising a base film that includes first and second surfaces, the second surface being closely attached to a surface of an object body directly or indirectly; and an optical fiber that has at least one FBG portion and that is fixed to the base film, wherein
the base film is formed with a through hole passing through the first and second surfaces, and
the optical fiber is fixed to the base film at a region other than the FBG portion such that the FBG portion is positioned on the through hole in plan view.

2. An optical pressure sensor according to claim 1, wherein
the optical fiber includes a plurality of the FBG portions having different reflection characteristics from one another and arranged along a longitudinal direction of the optical fiber,
the base film is formed with a plurality of the through holes, and
the optical fiber is arranged such that each of the plurality of FBG portions is arranged on the corresponding through hole of the plurality of through holes in plan view.

3. An optical pressure sensor according to claim 2, further comprising a flexible cover film arranged on the first surface of the base film so as to cover any of the plurality of through holes.

4. An optical pressure sensor according to claim 1, wherein
the optical fiber includes a plurality of the FBG portions having different reflection characteristics from one another and arranged along a longitudinal direction of the optical fiber,
the base film is formed with a single through hole, and
the optical fiber is arranged such that the plurality of FBG portions are arranged on the single through hole in plan view.

5. An optical pressure sensor according to claim 4, further comprising a flexible cover film arranged on the first surface of the base film for covering a predetermined area of the single through hole so as to cover any of the plurality of FBG portions.

6. An optical pressure sensor according to claim 1, wherein the optical fiber is fixed to the base film at both sides of the FBG portion.

7. An optical pressure sensor according to claim 1, further comprising a rigid cover plate fixedly attached to the first surface of the base film directly or indirectly, the cover plate being formed with a passing hole at a position corresponding to the FBG portion.

8. An optical pressure sensor according to claim 7, further comprising a flexible spacer film interposed between the base film and the cover plate, the spacer film being formed with an aperture fluidly connecting the through hole and the corresponding passing hole.

9. An optical pressure sensor according to claim 1, further comprising an adhesive film fixedly attached to the second surface of the base film, the adhesive film including, on a surface opposite the base film, an adhesive layer capable of adhering to the object body.

10. An optical pressure sensor according to claim 1, wherein
the optical fiber includes a temperature compensating FBG portion, the temperature compensating FBG portion being inserted into a rigid hollow member fixed to the base film.

11. An optical pressure sensor according to claim 1, wherein
the base film is formed with a groove at the first surface, and
the optical fiber is arranged in the groove.

12. An optical pressure sensor according to claim 1, wherein
a hollow reinforcing member is arranged in the through hole, the reinforcing member has rigidity higher than the base film, and
the optical fiber is arranged such that the FBG portion is positioned on a hollow portion of the reinforcing member in plan view.

13. An optical pressure sensor comprising a base member fixedly attached to an object body, and an optical fiber that has at least one FBG portion and that is fixed to the base member, wherein
the base member includes a sealed space in which a surface facing an external pressure to be measured is covered with a flexible first cover film,
the optical fiber is fixed to the base member at a region other than the FBG portion such that the FBG portion is positioned on the sealed space with the FBG portion contacted to an inner surface of the first cover film, and
the change of reflection characteristic of the FBG portion is detected in a state where the sealed space is maintained at a reference pressure.

14. An optical pressure sensor according to claim 13 wherein the FBG portion is fixedly attached to the inner surface of the first cover film such that a bending of the FBG portion follows a bending of the first cover film caused by a change of the external pressure with respect to the reference pressure.

15. An optical pressure sensor according to claim 13 wherein
the base member has a flexible base film that includes first and second surfaces and a through hole passing through the first and second surfaces, the second surface being closely attached to a surface of the object body directly or indirectly; the first cover film fixedly attached to the first surface of the base film so as to cover one end of the through hole; and a flexible second cover film fixedly attached to the second surface of the base film so as to cover the other end of the through hole for forming the sealed space in cooperation with the first cover film, and
the optical fiber is interposed between the first surface of the base film and the first cover film such that the FBG portion is positioned on the through hole in plan view.

16. An optical pressure sensor according to claim 15, wherein
the optical fiber includes a plurality of the FBG portions having different reflection characteristics from one another and arranged along a longitudinal direction of the optical fiber,
the base film is formed with a plurality of the through holes and a slit fluidly connecting the plurality of through holes from one another,
the optical fiber is arranged such that each of the plurality of FBG portions is arranged on the corresponding through hole of the plurality of the through holes in plan view,
the first and second cover films are respectively fixed to the first and second surfaces so as to cover the plurality of through holes and the slit, and
the base film is further formed with an external communicating slit having a first end fluidly connected to the sealed space that is defined by the plurality of through holes and the slit and a second end opened to the outside.

17. An optical pressure sensor according to claim 15, wherein
the optical fiber includes a plurality of the FBG portions having different reflection characteristics one another and arranged along a longitudinal direction of the optical fiber,
the base film is formed with a single through hole,
the optical fiber is arranged such that the plurality of FBG portions are arranged on the single through hole in plan view, and
the base film is further formed with an external communicating slit having a first end fluidly connected to the single through hole and a second end opened to the outside.

18. An optical pressure sensor according to claim 15, wherein
the base film is formed with a groove at the first surface, and
the optical fiber is arranged in the groove.

19. An optical pressure sensor according to claim 13, wherein
the first cover film is formed with a groove at the inner surface, and
the optical fiber is arranged in the groove.

20. An optical pressure sensor according to claim 13, wherein
the optical fiber includes a temperature compensating FBG portion, the temperature compensating FBG portion being inserted, in a elongating and compressing manner along the longitudinal direction, into a rigid hollow member fixed to the base film.

21. An optical pressure sensor comprising a base member fixedly attached to an object body, and an optical fiber that has at least one FBG portion and that is fixed to the base member, wherein
the base member includes a sealed space in which a surface facing an external pressure to be measured is covered with a flexible first cover film,
the optical fiber is fixed to the base member at a region other than the FBG portion such that the FBG portion is positioned on the sealed space with the FBG portion contacted to an outer surface of the first cover film, and
the change of reflection characteristic of the FBG portion is detected in a state where the sealed space is maintained at a reference pressure.

22. An optical pressure sensor according to claim 21 wherein
the base member has a flexible base film that includes a first surface on which an external pressure applies and a second surface closely attached to a surface of the object body directly or indirectly, the base film including a through hole passing through the first and second surfaces; the first cover film fixedly attached to the first surface of the base film so as to cover one end of the through hole; and a flexible second cover film fixedly attached to the second surface of the base film so as to cover the other end of the through hole for forming the sealed space in cooperation with the first cover film, and
the optical fiber is fixed to the outer surface of the first cover film such that the FBG portion is positioned on the through hole in plan view.

23. An optical pressure sensor according to claim 21, wherein
the first cover film is formed with a groove at the outer surface, and
the optical fiber is arranged in the groove.

24. An optical pressure sensor according to claim 1, wherein
the optical fiber is wholly positioned on the through hole.

25. An optical pressure sensor according to claim 1, wherein
the optical fiber is partially positioned on the through hole.

* * * * *